US009209943B1

(12) United States Patent
Firoiu et al.

(10) Patent No.: US 9,209,943 B1
(45) Date of Patent: Dec. 8, 2015

(54) CONTROL OVER NETWORK CODING FOR ENHANCED RADIO TRANSPORT OPTIMIZATION

(71) Applicant: BAE Systems Information and Electronic Systems Integration Inc., Nashua, NH (US)

(72) Inventors: Victor Firoiu, Westford, MA (US); Brian T. DeCleene, North Reading, MA (US); Gregory Lauer, Westford, MA (US); Xinzhuo Shen, Littleton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 282 days.

(21) Appl. No.: 13/911,631

(22) Filed: Jun. 6, 2013

Related U.S. Application Data

(60) Provisional application No. 61/656,289, filed on Jun. 6, 2012.

(51) Int. Cl.
*H04L 1/18* (2006.01)
*H04L 1/08* (2006.01)

(52) U.S. Cl.
CPC .............. *H04L 1/08* (2013.01); *H04L 1/189* (2013.01); *H04L 1/1816* (2013.01); *H04L 1/1819* (2013.01)

(58) Field of Classification Search
CPC ................................................ H04L 1/1809
See application file for complete search history.

(56) References Cited

U.S. PATENT DOCUMENTS

| | | | | |
|---|---|---|---|---|
| 6,505,253 B1 * | 1/2003 | Chiu et al. | ............ | 709/235 |
| 6,507,562 B1 * | 1/2003 | Kadansky et al. | ............ | 370/216 |
| 6,526,022 B1 * | 2/2003 | Chiu et al. | ............ | 370/229 |
| 6,693,907 B1 * | 2/2004 | Wesley et al. | ............ | 370/390 |
| 7,185,077 B1 * | 2/2007 | O'Toole et al. | ............ | 709/223 |
| 7,844,687 B1 * | 11/2010 | Gelvin et al. | ............ | 709/220 |
| 2008/0056255 A1 * | 3/2008 | Birman et al. | ............ | 370/390 |
| 2012/0320732 A1 * | 12/2012 | Simu et al. | ............ | 370/216 |

OTHER PUBLICATIONS

Rudolf Ahlswede, Ning Cai, Shuo-Yen Robert Li, and Raymond W. Yeung, Network Information Flow, IEEE Transactions on Information Theory, vol. 46, No. 4, Jul. 2000.

Sanjit Biswas and Robert Morris, ExOR: Opportunistic Multi-Hop Routing for Wireless Networks, SIGCOMM'05, Aug. 22-26, 2005.

(Continued)

*Primary Examiner* — Esaw Abraham
(74) *Attorney, Agent, or Firm* — Sand & Sebolt; Daniel J. Long

(57) ABSTRACT

A system and method for transmitting encoded data in a network is presented. The method begins with a source node of a network encoding a first generation of data using linearly-independent encoding vectors to produce an encoded first generation. Next, packets containing the encoded first generation are created. The packets are then transmitted over a subgraph of nodes with multiple paths to a destination node. A determination is made at a receiving node that an insufficient amount of packets of the encoded first generation have been received in order to decode the encoded first generation. A repair request is sent from the receiving node to nodes upstream to indicate a need for more packets of the encoded first generation without specifying a particular packet. In response to the repair request, at least one node upstream from the receiving node sends a packet with encoded first generation data.

19 Claims, 15 Drawing Sheets

(56) References Cited

OTHER PUBLICATIONS

Szymon Chachulski, Michael Jennings, Sachin Katti, and Dina Katabi, Trading Structure for Randomness in Wireless Opportunistic Routing, SIGCOMM'07, Aug. 27-31, 2007.

Douglas S.J. De Couto, Daniel Aguayo, John Bicket, and Robert Morris, A High-Throughput Path Metric for Multi-Hop Wireless Routing, MobiCom '03, Sep. 14-19, 2003.

Supratim Deb, Michelle Effros, Tracey Ho, David R. Karger, Ralf Koetter, Desmond S. Lun, Muriel Medard, and Niranjan Ratnakar, Network Coding for Wireless Applications: A Brief Tutorial, publication source and date not known, printed Jun. 4, 2013.

Tracey Ho, Ralf Koetter, Muriel Medard, David R. Karger, and Michelle Effros, The Benefits of Coding over Routing in a Randomized Setting, ISIT 2003, Yokohama, Japan, Jun. 29-Jul. 4, 2003, IEEE 2003.

B. Adamson, C. Bormann, M. Handley, and J. Macker, Negative-Acknowledgment (NACK)—Oriented Reliable Multicast (NORM) Building Blocks, Memo, The Internet Society, 2004.

V. Jacobson, Congestion Avoidance and Control, Proc. SIGCOMM '88, vol. 18, No. 4, Aug. 1988.

Ralf Koetter and Muriel Medard, An Algebraic Approach to Network Coding, IEEE/ACM Transactions on Networking, vol. 11, No. 5, Oct. 2003.

Sachin Katti, Hariharan Rahul, Wenjun Hu, Dina Katabi, Muriel Medard, and Jon Crowcroft, XORs in The Air: Practical Wireless Network Coding, SIGCOMM'06, Sep. 11-15, 2006.

Shuo-Yen Robert Li, Raymond W. Yeung, and Ning Cai, Linear Network Coding, IEEE Transactions on Information Theory, vol. 49, No. 2, Feb. 2003.

Desmond S. Lun, Muriel Medard, Ralf Koetter, and Michelle Effros, Further Results on Coding for Reliable Communication over Packet Networks, publication source and date not known, printed Jun. 4, 2013.

Joon-Sang Park, Mario Gerla, Desmond S. Lun, Yunjung Yi, and Muriel Medard, CodeCast: A Network-Coding-Based Ad Hoc Multicast Protocol, IEEE Wireless Communications, Oct. 2006.

\* cited by examiner

Slave Forwarder: Get Packet to Send

- Choose generation from which to send
- Get data packet as linear combination from Network Coding module
- Collect feedback from all generations
- Combine data and feedback into packet to send

CONTROL OVER NETWORK CODING FOR ENHANCED RADIO TRANSPORT OPTIMIZATION

CROSS REFERENCE TO RELATED APPLICATION

This application claims priority from U.S. Provisional Application Ser. No. 61/656,289, filed Jun. 6, 2012; the disclosure of which is incorporated herein by reference.

BACKGROUND OF THE INVENTION

1. Field of Invention

The current invention relates generally to apparatus, systems and methods for transmitting data in a wireless network. More particularly, the apparatus, systems and methods relate to transmitting data in a mobile ad-hoc network (MANET). Specifically, the apparatus, systems and methods provide for transmitting data in MANETs while allowing for the repair of packets.

2. Description of Related Art

Mobile Ad-Hoc Networks (MANETS) have emerged as a critical component of the United State military's operational concept of dominant maneuver and precision engagement. However, despite the rise of pervasive commercial wireless communications within the US and advances in radio technologies (e.g., UWB) that are more effective in military environments, DoD MANETS continue to provide only a fraction of their potential capacity to the WarFighter. Some of the reasons for this stem from challenges that are unique to the military including scarcity of spectrum in foreign countries, lack of stable infrastructure, and non-commercial requirements such as mission-critical systems that cannot tolerate "busy" signals. However, when constrained by today's IP-based technology (which is based on fundamentally different "wired" and usage assumptions), the technical challenges faced by military MANETS are even further compounded. Recent research successes in cross-layer optimization and protocols that exploit the "broadcast advantage" suggests that a new paradigm is required to replace today's core protocol stack and address the "fog of MANETs" that have uncertainty of topology, state, and packet radio reception.

SUMMARY

The present invention is a MANET solution that makes use of Control Over Network-Coding for Enhanced Radio Transport Optimization (CONCERTO) that is enabled by the paradigm shift afforded by network-coding. In particular, network coding provides an approach which allows the achievement of the full theoretical throughput capacity of wireless multicast; enables efficient solutions to multicast optimization problems that are NP-complete in the absence of network-coding; provides robustness to loss and routing loops; unifies unicast, multicast, broadcast, and multi-path algorithms; subsumes rateless coding at the edges; and exploits opportunistic transmissions.

The preferred embodiment of the inventions is a method for transmitting encoded data in a network. The method begins with a source node of a network encoding a first generation of data using linearly-independent encoding vectors to produce an encoded first generation. Next, packets containing the encoded first generation are created. The packets are then transmitted over a subgraph of nodes with multiple paths to a destination node. A determination is made at a receiving node that an insufficient amount of packets of the encoded first generation have been received in order to decode the encoded first generation. A repair request is sent from the receiving node to nodes upstream to indicate a need for more packets of the encoded first generation without specifying a particular packet. In response to the repair request, at least one node upstream from the receiving node sends a packet with encoded first generation data.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the Illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 12 illustrates how CONCERTO disseminates topology and group information using an OLSR plug-in.

Similar numbers refer to similar parts throughout the drawings.

DETAILED DESCRIPTION

The major section of this detailed description include: CONCERTO architecture, network coding, topology discovery, subgraph construction, network coding transport protocols and IP-CONCERTO gate. These topics will be discussed in the order listed.

CONCERTO Architecture

Traditional MANET architectures start with the layered architecture which has worked so well in wireline IP networks. Unfortunately the limited bandwidth available in MANETs requires efficient algorithms that operate across different layers. Layerless Modular Architecture (LMA) has been developed for CONCERTO which allows different algorithms to efficiently share information.

In the preferred embodiment, a CONCERTO system can be using a Layerless Modular Architecture (LMA). The LMA provides a unified protocol composition and integration framework. The LMA can provide:

1. Functional Modularity: Protocols are inherently composed of common building blocks. The ability to modularize these functions and introduce them into the system is necessary for future evolution of the system and rapid prototyping.
2. Structural Conveyance: Key information such as traffic measurements, control settings, status, and data messages need to be conveyed between functional models in a consistent but flexible fashion. By breaking the OSI stack model, previously defined algorithms can not assume any predefined layered architecture and, in fact, potentially exchange information between modules that would typically not be available within a layered architecture: hence the term layerless.
3. Hybridization: Hybridization allows multiple protocols that address variants of the same problem to coexist on the same node. This capability allows MANET performance to be select between alternative protocols when modifying parameters is insufficient
4. Unified Packet Header Construction: If functional modules are independent, they can no longer assume that they have access to payload information that may have been collected by another module. Equivalently, functional modules may insert redundant information onto a packet header to insure they can each operate without the other. Given the criticality of bandwidth in MANET environments, it is imperative that redundant header information be removed and compressed to minimize overhead.

Figure 1:
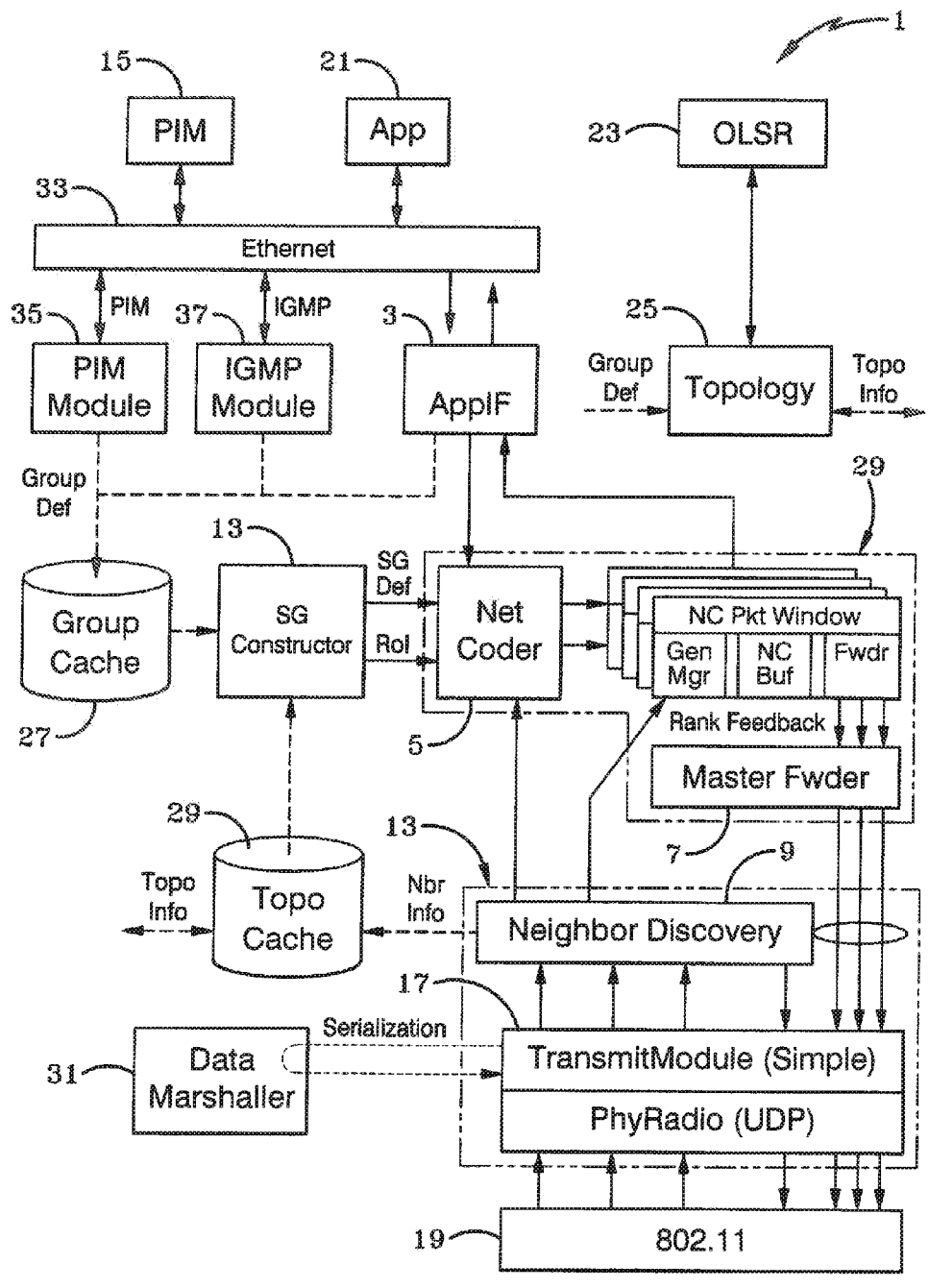
FIG. 1 illustrates a preferred embodiment of the block diagram of system using coded data.

FIG. 1 is an example illustration of the preferred embodiment of a CONCERTO system 1 that includes control over network coding for enhanced radio transport optimization. The primary components of the CONCERTO system include an application interface 3 that receives packets from the application, classifies them in class types and passes them to the network coding module. A network coding module logic 5 application packets and applies random linear coding. Coded packets are provided to forwarding engine logic 7 upon request. It also decodes packets at destination nodes. The forwarding engine logic 7 uses original transport protocols for deciding which packets need to be encoded, forwarded, decoded, discarded, retransmitted, timed-out. A Topology discovery/neighbor discovery logic 9 determines connectivity and disseminates it throughout the network to support the subgraph construction. A group manager logic 11 keeps track of which destinations are members of which multicast group. This information is needed to build a subgraph between the source and destinations. Subgraph Constructor logic 13 uses information on network topology, multicast group, source and destination nodes to create routing structures (subgraphs) that designate nodes for forwarding network coded packets for each application session. The protocol independent multicast (PIM) logic 15 provides gateway functionality and interoperability between a CONCERTO-based network and other IP-based networks. 802.11 broadcast/PHY radio/wireless logic 17 provide an interface to an 802.11 network or another radio device.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics. The system can have other useful components as understood by those of ordinary skill in the art including an application 21, an OSR 23, a topology logic 25, a group cache 27, a packet window logic 29, a data marshal logic 31, an Ethernet 33, a PIM logic 35 and a TGMP logic 37.

Figure 2:
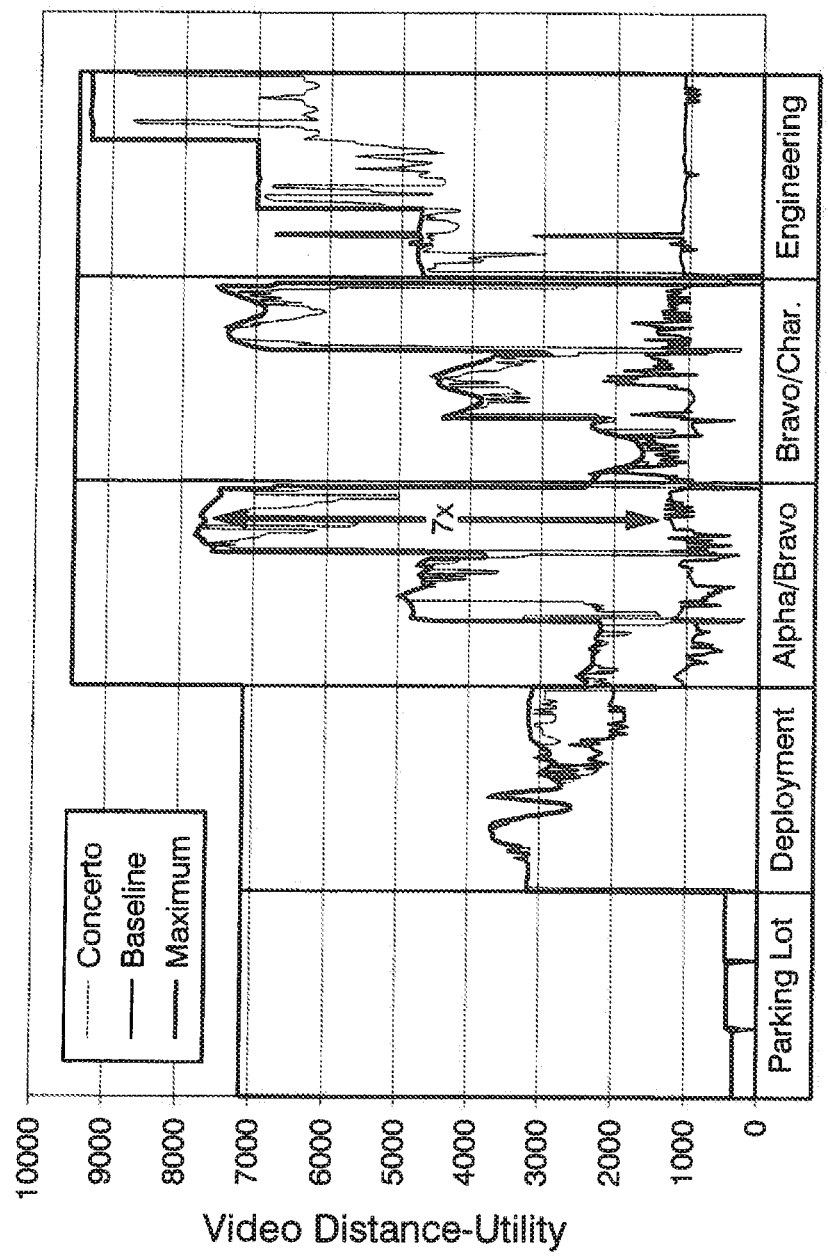
FIG. 2 illustrates graphically how the preferred embodiment system out performs baseline protocols in field trials.

FIG. 2 illustrates how an actual CONCERTO system built and tested by BAE Systems dramatically outperforms baseline protocols in actual testing of some of the components of the system 1 of FIG. 1.

Network Coding

Network-coding has been known for some time, however, its potential as a revolutionary networking paradigm has only been shown more recently based on research developing the preferred embodiment of FIG. 1 that includes control over network coding for enhance radio transport optimization. Coding within a network allows a source to multicast information at a rate approaching the smallest cut between the source and any receiver. Given an example of a directed network where the maximum multicast throughput is not achievable without network-coding it is possible to prove that linear coding with finite symbol size is sufficient for multicast connections. It has also been earlier demonstrated that network-coding can be used to provide robust solutions to networks with link failures, in which only receiver nodes need to change behavior in response to different failures.

A number of network-coding algorithms have been proposed (predominantly by BAE Systems) and analytically shown to have good properties in terms of efficiency, complexity, robustness, and/or security. Distributed randomized network-coding has been introduced, in which network nodes independently and randomly choose linear mappings from inputs onto outputs over some field, and the aggregate effect of the various random code choices in the network are inexpensively communicated to the receivers as vectors of coefficients within each signal block or packet.

The implementing of random distributed network coding in MANETs is summarized as follows. Random distributed network coding can achieve the capacity of single multicast connection in a given coding subgraph z. As a consequence, in setting up optimal single multicast connections in a network, there is no loss of optimality in separating the problems of subgraph selection and coding, i.e., separating the optimization for a minimum-cost subgraph, as discussed later, and the construction of a code for a given subgraph, which is now discussed.

Figure 3:
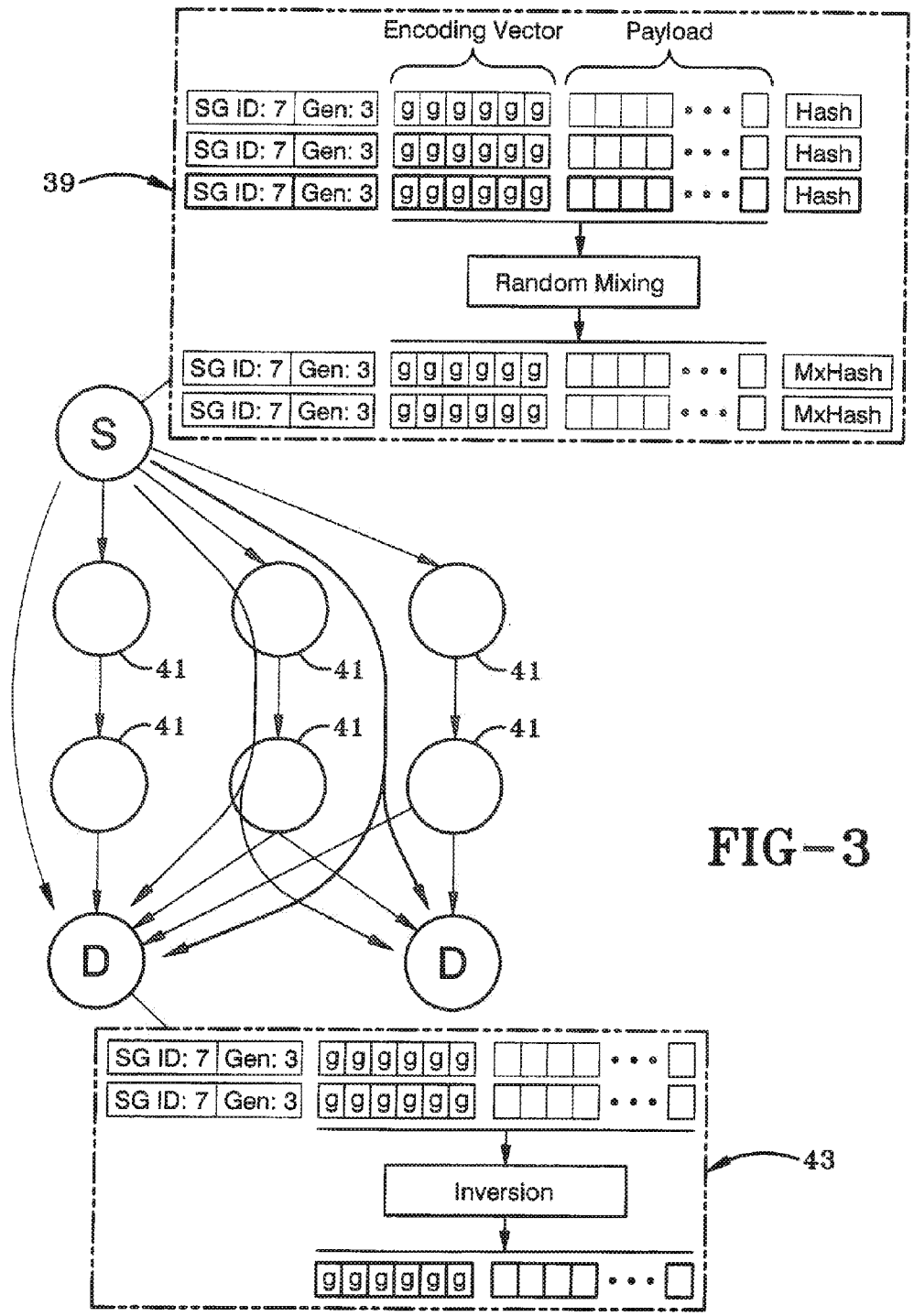
FIG. 3 illustrates a global encoding vector in each packet is used by the destination to decode.

Suppose that, at the source node s, has G message packets $w_1, w_2 \ldots w_G$, which are vectors of length $\rho$ over the finite field $\Phi_q$. (If the packet length is b bits, then we take $\rho = \lceil b/\log_2 q \rceil$). The message packets are initially present in the memory of node s. The coding operation performed by each node is simple to describe and is the same for every node: received packets are stored into the node's memory, and packets are formed for injection with random linear combinations of its memory contents whenever a packet injection occurs on an outgoing hyperarc. The coefficients of the combination are drawn uniformly from $\Phi_q$. Since all coding is linear, any packet x in the network can be written as a linear combination of $w_1, w_2 \ldots w_G$, namely, $x = \sum_{i=1}^{G} \gamma_i w_i$. Let $\gamma$ the global encoding vector of x, and assume that it is sent along with x, in its header. The overhead this incurs (namely, G $\log_2$ q bits) is negligible if packets are sufficiently large. A sink node collects packets and, if it has G packets with linearly-independent global encoding vectors, it is able to recover the message packets. Decoding can be done by Gaussian elimination. In addition, the scheme can be operated ratelessly, i.e., it can be run indefinitely until all sink nodes in T can decode (at which stage that fact is signaled to all nodes, requiring only a small amount of feedback). The preferred implementation of network coding can be graphically presented as in example FIG. 3 and summarized as follows:

- Collect packets into groups of G packets (generations)
- The source prefixes the $i^{th}$ packet with the $i^{th}$ unit vector
- Each node in the subgraph transmits random combinations of packets in a generation
- Packet headers collect coefficients used in random coding
- Each destination collects packets until it has G linearly independent coding vectors
- Each destination inverts the matrix of random coefficients to recover the original packets This implementation allows multiple generations to be outstanding at the same time. FIG. 3 illustrates in a table 39 how generations are randomly mixed at a source node S then relayed through intermediate nodes 41 and then later illustrates in table 40 how the generations are inverted at one or more destination nodes D. Distributed random network coding achieves the single multicast capacity of a subgraph z. The details of how to construct this subgraph are given below.

A powerful feature of network coding is that it subsumes a wide range of other MANET mechanisms. This means that network coding provides an infrastructure which unifies hitherto disparate network algorithms—greatly simplifying the configuration and coordination of these algorithms.

Figure 4:
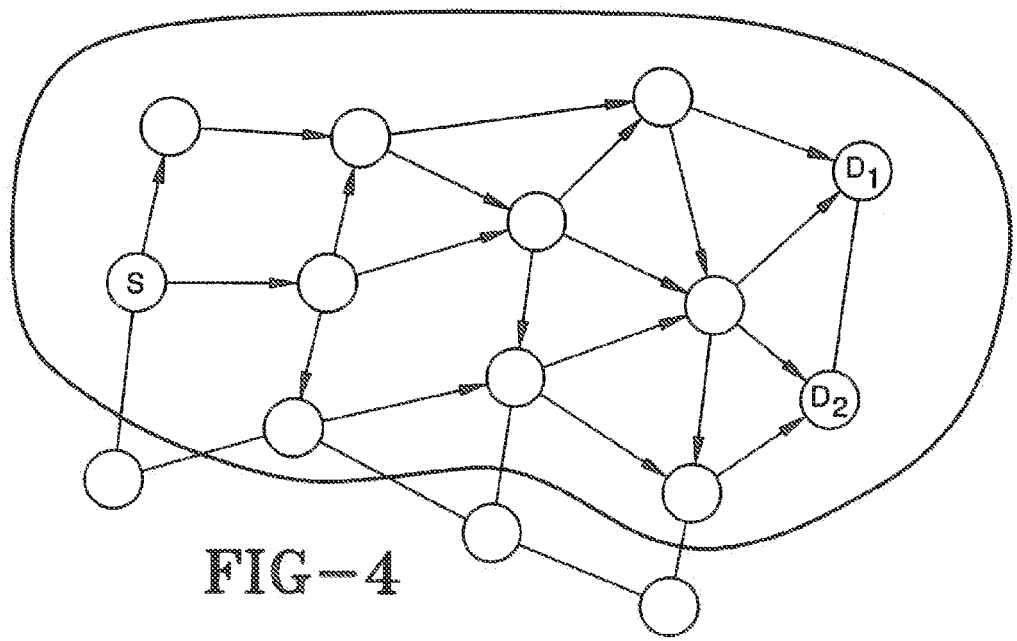
FIG. 4 illustrates how network coding support multicast directly.

The network coding problem formulation is intrinsically a multicast problem formulation. Subgraphs are constructed to support the desired flow from a source to a set of destinations (if the flow is feasible). FIG. 4 illustrates a subgraph which supports a flow of information from the source node S to destinations $D_1$ and $D_2$ as how network coding can support multicast directly.

Figure 5:
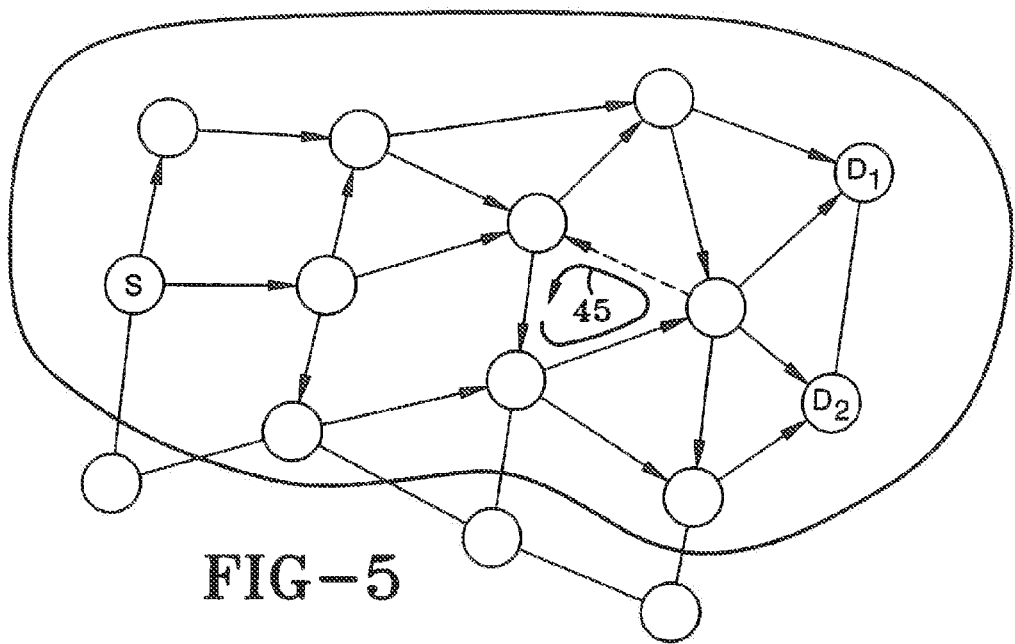
FIG. 5 illustrates how network coding is robust to "loops".

In MANETs, the latency in forwarding topology information means that nodes may not have an accurate picture of the network topology. In packet forwarding networks this can lead to a problem with forwarding loops. For example, consider the scenario depicted in FIG. 5 where a forwarding loop 45 exists. In routed networks these loops cause significant problems—possibly making destinations unreachable and reducing bandwidth through useless retransmissions of the same packet. Since network coding forwards information flows on a subgraph (via mixtures of packets in a generation) rather than packets, network coding does not have a "forwarding loop" problem. If a packet is received which is not innovative (i.e., its encoding vector lies in the subspace of information already known at that node) then it does not cause any further transmissions.

Note that subgraphs typically are robust to link or node failures (FIG. 6) since the optimal solution frequently incorporates more nodes than would be used in a routed network's spanning tree. Robustness can readily be enhanced by requiring that subgraphs have a minimum cut set connectivity.

Figure 6:
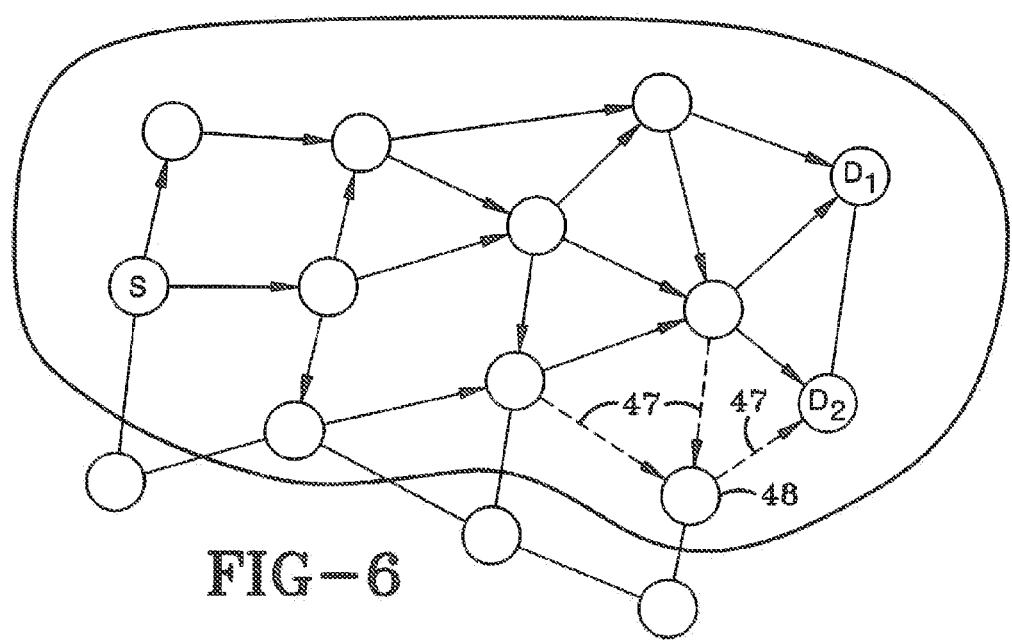
FIG. 6 illustrates how network coding provides robustness to link and node failure.
Figure 7:
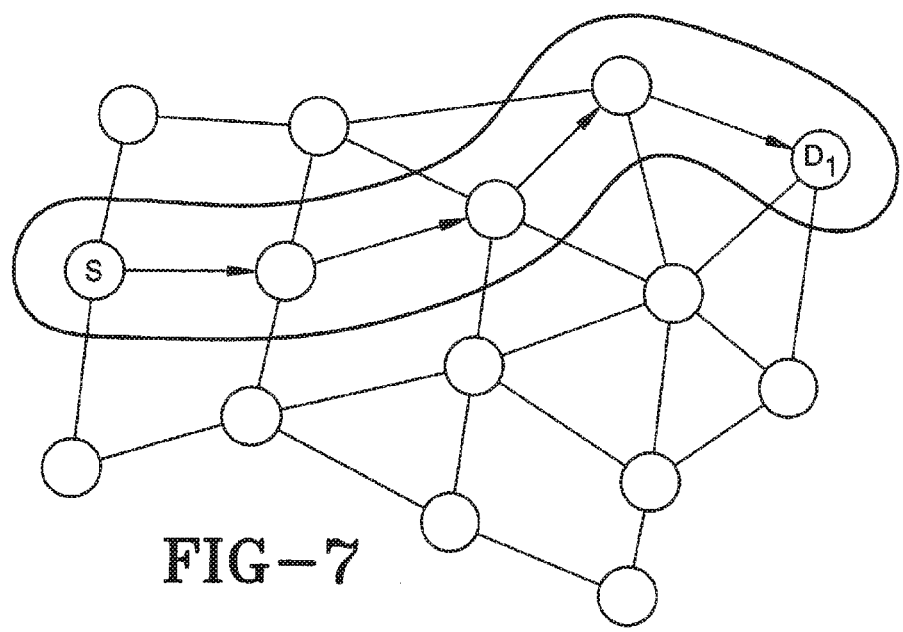
FIG. 7 illustrates that unicast is a special case of network coding where the subgraph is a route.

FIG. 6, illustrates how network coding can provide robustness when a links and/or a node fall. In routed networks unicast routing algorithms are typically distinct from multicast routing algorithms. This complicates configuration, since the two algorithms are not aware of each other. In network coding unicast is simply a special case of multicast—i.e., the case where the set of multicast destinations is a singleton.

Figure 8:
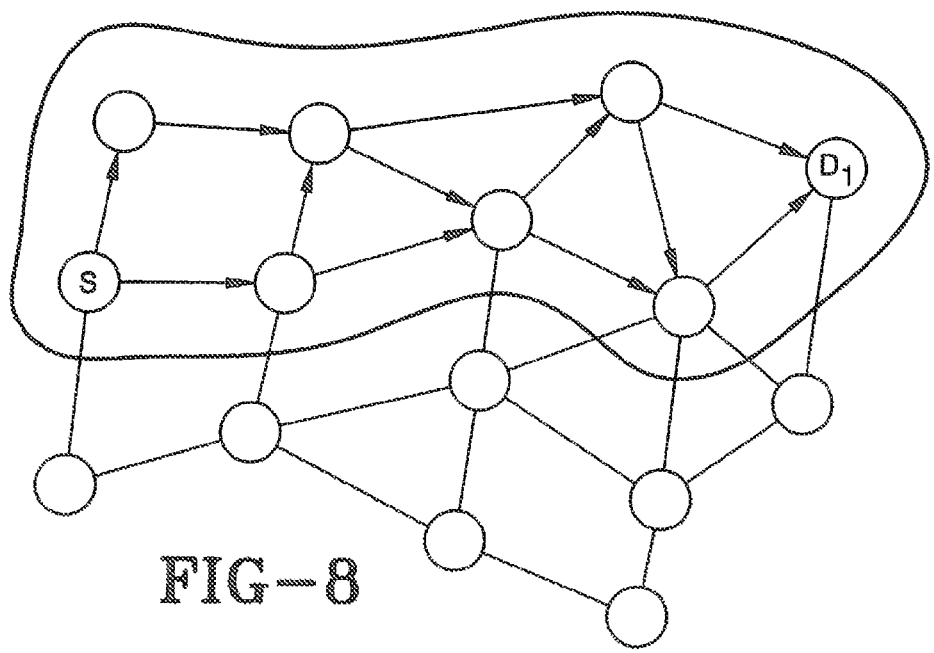
FIG. 8 illustrates how multipath unicast is much simpler in a network coded architecture.

FIG. 8 illustrates a unicast situation that a special case of network coding where the subgraph is a route.

In routed networks the use of single paths to forward traffic causes fragility (e.g., the loss of a node or link can cause a destination to become unreachable). This fragility can be reduced by using multiple forwarding paths. For example, the source may compute multiple link-disjoint or node-disjoint paths between itself and the destination. Packets are then sent over these disjoint paths to reduce the likelihood of interruption due to loops or link/node failures. While it is difficult to compute disjoint paths, they are required since otherwise a single node or link failure could affect all of the paths. Since network coding forwards information along all the paths in the subgraph, it does not suffer from this problem. If the subgraph is k-connected, then it will be resilient to failures of up to k links/nodes. FIG. 8 illustrates how multiple path unicast is much simpler in a coded architecture.

Link layer coding (forward error correction, FEC) is typically used in routed networks to improve the reliability of links. Link quality is estimated and packets to be sent over that link are encoded so that if K-of-N encoded packets are received, then the original packets can be reconstructed. The values of K and N are selected to meet reliability requirements and latency constraints. If end-to-end coding is used then the capacity of the end-to-end path is simply the product of the individual probabilities of link success: $(1-\epsilon_1)(1-\epsilon_2)$. If per-link FEC coding is used then the capacity is higher—min $(1-\epsilon_1, 1-\epsilon_2)$—but delay is increased since all the encoded packets must be reconstructed at the intermediate nodes.

Figure 9:
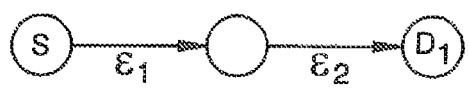
FIG. 9 illustrates link layer encoding (FEC) is subsumed by network coding
Figure 10:
FIG. 10 illustrates rateless coding is subsumed by network coding

Network coding achieves the capacity of hop-by-hop encoding ($\min(1-\epsilon_1, 1-\epsilon_2)$) and, since packets are not reconstructed at intermediate nodes attains the lower latency of end-to-end encoding. Network coding naturally subsumes link layer coding since these results are obtained directly if the subgraph constructed is given in FIG. 9.

In MANETs the loss characteristics of links may change too rapidly to be characterized accurately. In this case a rateless approach to link layer coding may be required in which a sequence of encoded packets is generated until the destination has recovered the source packets. End-to-end approaches such as Digital Fountain take this approach in multicast networks. Network coding provides this functionality at a hop-by-hop level—with the expected benefits of reduced transmissions and Increased capacity. FIG. 1 illustrates how rateless coding is subsumed by network coding.

Random network coding allows nodes to generate an unlimited number of linear combinations of packets. It is thus straightforward for a node to generate new combinations until the destination node(s) have received G linearly independent combinations and can decode. Feedback is required to let upstream node(s) know when to stop sending and the rate at which they should send. Algorithms for accomplishing this are discussed in detail later.

Topology Discovery

Computing the routing structure (Subgraph construction) requires knowledge of the MANET topology. In this section we describe the design of the topology discovery subsystem in CONCERTO. The role of topology discovery is to determine basic point-to-point connectivity among neighboring wireless nodes and disseminate this local information to the rest of the nodes in the network. This information is used by those nodes that are sources of multicast flows to determine the routing structure (subgraph calculation is described in the next section).

During topology discovery each node floods its own link state along with link state from any other node in the network. This flooding-based approach results in redundant information transmitted through the network, with the advantage that link state updates are robust to network losses. While this worked well in small networks (10-20 nodes), it is difficult to scale it to larger networks (above 20 nodes) where the link state updates become the majority of traffic volume.

An improved topology discovery uses the OLSR protocol configured for link state dissemination only, with routing data packets disabled. Through the use of multipoint relays (MPRs), OLSR greatly reduces the overhead required to propagate link state messages. Hence, OLSR is selected to disseminate the network topology and other information, while topology cache is used to store the network topology information. This approach reduces the control traffic overhead by as much as 10 times over the broadcast-based global topology discovery methods used in CONCERTO than the prior approach.

Figure 11:
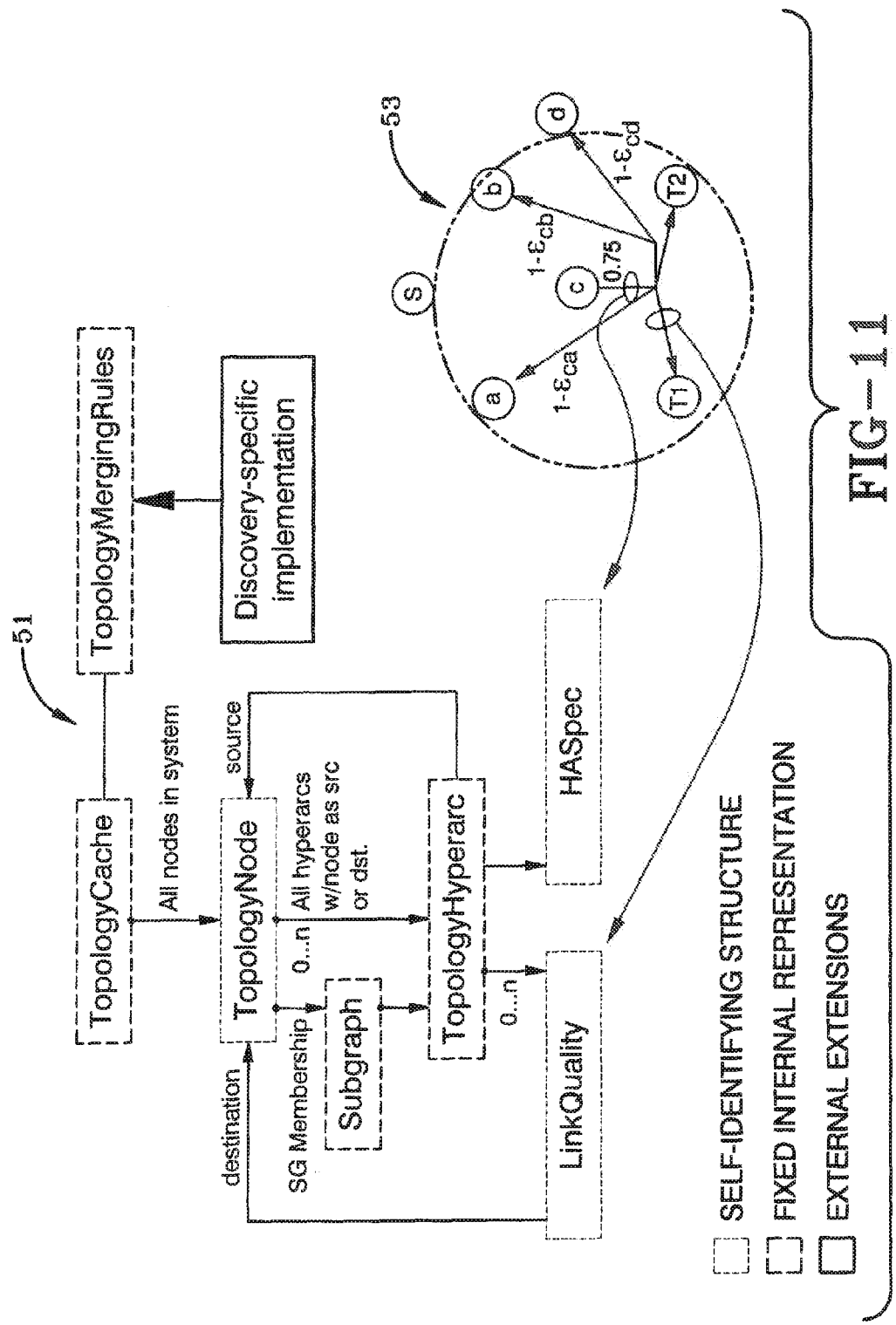
FIG. 11 illustrates on example block diagram of topology cache architecture.

In the following:

Each node stores network topology in the topology cache, which is provided by the CONCERTO framework. This topological information is composed of unique CONCERTO node identifiers and the hyperarcs associated with each node. A hyperarc is a source node, a set of destination nodes, and the transmission properties that characterize the broadcast of information from the source to the set of destinations. FIG. 11 depicts the CONCERTO System's topology cache architecture.

The lower right hand portion of the figure depicts an example of nodes in a wireless MANET environment. Node c can reach nodes a, b, T1, and T2 with a single broadcast and occasionally reach node d as well. Each of these nodes maps to a TopologyNode component, as illustrated in the figure. The relationship of these nodes is captured within the hyperarc (mapped to the TopologyHyperarc component) grounded at node c and ending at the other nodes. In this example, the head of the hyperarc is notionally labeled with general constraints on the broadcast (e.g., a transmit power level of 0.75) which are encapsulated in the hyperarc specification (HASpec). At the tail of each hyperarc are factors associated with the broadcast to a particular node (this maps to the LinkQuality component). In this example, different nodes may have different probabilities of actually receiving the transmission.

The following describes some of the components that comprise the Topology Cache 51:

TopologyCache: The topology cache 51 stores discovered topology information, including node information and the relationships between nodes. As link information between nodes is discovered, the information in the TopologyCache is updated. During this update process, the following information is provided: unique source node id, unique destination node id, link quality attributes, and hyperarc specification attributes. Node and hyperarc information can also be removed from the TopologyCache 51 as required. Additionally, the TopologyCache 51 provides access to the stored topology data. Example information queries include: retrieval of the set of neighbor nodes a specified number of hops from a specified node; retrieval of all hyperarc root nodes; retrieval of the topology information for an identified CONCERTO node; retrieval of the link quality characteristics from a source node to a destination node for a given hyperarc specification. The TopologyCache 51 is composed of a TopologyMergingRules implementation and a collection of TopologyNode objects.

TopologyNode: This component stores the topological information for a discovered node, including the node's unique CONCERTO system id, the Subgraphs that the node participates in, and a list of the hyperarcs rooted at the node. As required, Subgraph objects and TopologyHyperarc objects are updated as new topology data is discovered. Example information queries include: retrieval of all topology hyperarcs rooted at the node; retrieval of the subgraphs the node participates in.

Subgraph: This component stores the information about the subgraphs that the topology node participates in.

TopologyHyperarc: The component provides a mechanism for updating and accessing hyperarc information. It is composed of a hyperarc specification and a collection of link qualities. Example information queries include: retrieval of the hyperarc attributes; retrieval of the link quality to a specified destination node; and retrieval of all destination nodes.

HASpec: The HASpec (short for Hyperarc Specification) is a collection of the identifying attributes for a hyperarc. Example attributes may include transmission frequency and transmission power. The CONCERTO system's DataInfo object is used to store the attributes for the hyperarc to provide a flexible definition. Algorithms that use different hyperarc attributes can be easily integrated into the CONCERTO system without having to modify the internal details of the topology cache.

LinkQuality: The quality of a link to one destination of a hyperarc is captured in the LinkQuality class. Once again, the attributes used to describe the link quality are based on the DataInfo object. This allows for easy integration of algorithms that use different link quality fields without having to modify the structure of the topology cache.

Beyond the component definitions and their relationships describe above, the topology cache 51 imposes the following functional constraints and requirements:

Information manipulation: The topology cache 51 supports updates to hyperarc and link quality information, topology queries, and the explicit removal of hyperarc and link information that is known to be no longer valid.

Information age: As topology information is updated, more recent information always replaces older information. Additionally, as topology information is added to the cache, information pruning data is provided. This is used to timeout stale hyperarc and link quality information.

Hyperarc destination uniqueness: No hyperarc will have multiple links to the same destination.

Hyperarc and Link Quality attributes: The definition of the hyperarc and link quality attributes must support "unknown" and "undefined" values. For example, a TopologyHyperarc may have to be created in the cache before knowing the attributes of the hyperarc specification. Additionally, the definition of a hyperarc specification and the link quality are based on a self-identifying structure as depicted in the figure.

Topology Discovery

Every node is responsible for locally measuring the probability of direct reception from every neighboring node (a.k.a. link quality), and tracks local multicast group subscriptions. It uses OLSR to disseminate this local information to the rest of the nodes in the network.

Beacon and Link Quality

Each node may periodically send a beacon announcing its presence to any nodes within range. The beacon contains the node's address. When the time for sending a beacon arrives, a node does not send a beacon if it has transmitted at least one packet in the previous beacon interval. Hence, beacons will likely be sent only when there is very little other traffic.

For example, a node X considers a node Y to be an incoming neighbor if X hears a beacon or any other packet transmitted from Y within a beacon interval. If node X does not hear anything from Y for three consecutive beacon intervals, it considers the link down (zero link quality). While the link is up the traffic received during the last ten beacon intervals is used to estimate the link quality. The beacon interval is currently set to one second.

CONCERTO calculates link quality independently of OLSR by measuring the fraction of transmissions received from each neighbor. Link quality calculated from real traffic is more accurate than the link quality OLSR would calculate from small, periodic, Hello messages. CONCERTO's link quality is passed to the OLSR plugin and inserted into the OLSR data structures. OLSR floods (using the BMF protocol) this link quality throughout the network using generic (opaque) OLSR messages with specific fields as follows.

Each node has a unique CONCERTO identification. Each node also has a unique IP address for its mobile interface. Each node will periodically send out the association of IP address and node identification.

Group

Each node will periodically send out the local multicast group subscriptions. All flooded group information received from other nodes is stored in the Group Cache.

Neighbor

Each node will periodically broadcast the locally measured link quality information to its neighbors.

Software Composition

Figure 12:
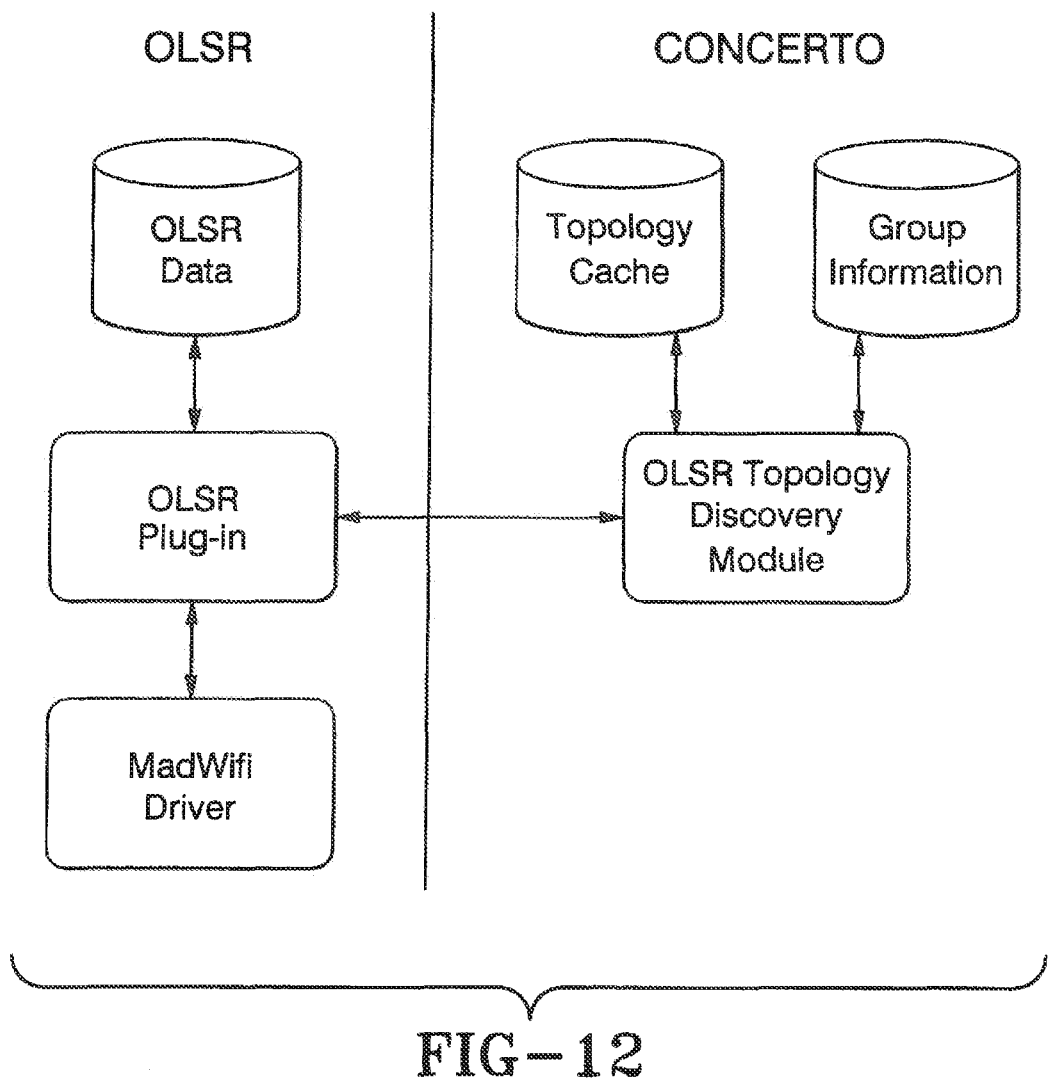

CONCERTO communicates with OLSR via a plug-in, which is implemented as a shared object library loaded by OLSR. The plug-in registers handlers for two message types in the private range for flooding CONCERTO-specific data throughout the network. The plug-in communicates with CONCERTO via TCP with the plug-in acting as server and CONCERTO acting as a client. The plug-in has direct access to OLSR's topology data structures. It writes locally-calculated link qualities to this database, and it reads remote link qualities from it. FIG. 12 illustrates one of how CONCERTO disseminates topology and group info using an OLSR plug-in.

Node Id and IP

CONCERTO unicast subgraph IDs are based on the source and destination CONCERTO node IDs. When unicast IP messages are received CONCERTO looks up the IP-to-CONCERTO-Node-ID binding in the group cache. The mapping between IP addresses and CONCERTO node ID is flooded via OLSR so that each node has this binding information for remote nodes.

Link Quality

OLSR calculates link quality using Hello messages, which are relatively small when compared to netcoded packets. OLSR uses this information to discover changes in topology, and to select Multipoint Relays (MPRs) for the purpose of select flooding of its messages that contain CONCERTO link quality information.

Multicast Group Subscription

Multicast group subscriptions are flooded through the network using OLSR. The locally-generated group information is passed to the OLSR plugin which floods it using a private message type. All flooded group information received from other nodes is passed to CONCERTO and then stored in the Group Cache.

Dynamic Groups

CONCERTO can be developed to initially focus development of the core novel technologies (network coding and transport protocols), while implementing simple mechanisms for ancillary features. In particular, in multicast group membership information can initially be static (constant over the duration of the experiment) and provided to each node by initial configuration. Nevertheless, practical applications require the possibility of dynamically changing group membership, which can be implemented later as described in the following.

Group Cache

The group cache stores information of which nodes are sources and destinations for each group. Each group cache record contains the following information:

Group id

Traffic class (Elastic Reliable, Inelastic Class 3, Inelastic Class 2, Inelastic Class 1, Inelastic Class 0, Unicast)

Source nodes

Destination nodes

Exclusions list—specifies that certain sources should not send to certain destinations Group cache information is required by the subgraph constructor to compute subgraph parameters for the purpose of forwarding netcoded packets.

Registering as a Source

When an application starts sending data to a multicast or unicast IP address, the CONCERTO Application Interface module 3 (See FIG. 1) intercepts the data packet, maps the destination IP address into a group id and traffic class and updates the local group cache by adding the node as a source for that group.

Registering as a Destination

Multicast

Applications can indicate interest in receiving multicast traffic using the IGMP protocol, specified in RFC 3376.

IGMP Query Messages

Concerto's IGMP module periodically sends IGMPv3 Membership Query Messages to the application host. The format of this message can conform to the specification defined by RFC 3376.

IGMP Membership Report Messages

In response to the IGMP Query message, the application host operating system will send an IGMP Membership Report Message to IP multicast address 224.0.0.22 (or another address). This message contains a complete list of the node's group memberships (as a destination). Concerto parses each IGMP group record and adds the node as a destination to each corresponding entry in the group cache, if not present already.

IGMP "Join" and "Leave" Messages

When an application wants to begin receiving multicast data (e.g. when the application starts), it sends an IGMP Report Message containing a "join" group record to multicast address 224.0.0.22 (or another address can be used). The join record specifies the multicast IP address that it wishes to receive. Concerto's IGMP module parses the message and then updates its local group cache by adding the node as a destination to the appropriate group cache entry.

When an application no longer wants to receive data (e.g. when the application is closed), it sends an IGMP Report Message containing a "leave" group record to multicast address 224.0.0.22 (or another address can be used). The leave record specifies the multicast IP address that it no longer wishes to receive. Concerto's IGMP module parses this message and then updates its local group cache by removing the node as a destination in the appropriate group cache entry.

Unicast

Each node can be configured by default to automatically register as a destination for its own unicast traffic.

Propagating Group Information

Group cache information needs to be propagated throughout the MANET so that all nodes have global knowledge of all group memberships. Each node periodically publishes its own group membership information to all other nodes. These group updates are efficiently propagated throughout the network using Concerto's OLSR plug-in. When Concerto receives an incoming group update message from a remote node, Concerto merges the remote node's group membership information into its local group cache.

Subgraph Construction

This section describes the algorithm that determines the nodes that participate in forwarding network coding packets given a multicast session with one source and a set of destination nodes. This set of nodes is referred to along with its directed links as the network coding subgraph of the given session. The algorithm also computes the degree to which each node contributes to the forwarding of the session's packets (their forwarding factors).

Figure 13:
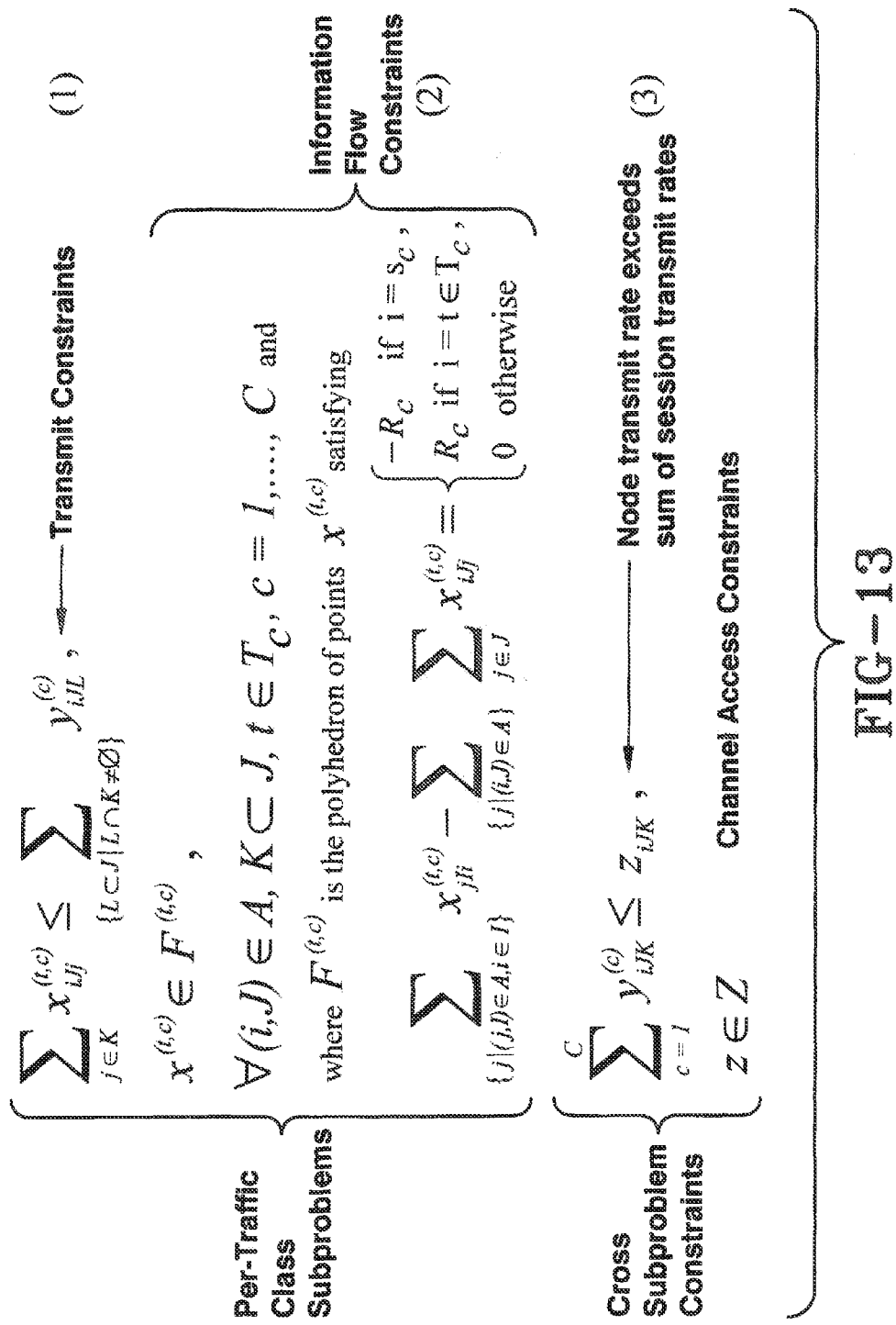
FIG. 13 illustrates an optimization problem for subgraph computation in a wireless network.

The basic theory of network coding derives methods for determining such subgraph that optimizes some network utility criteria. For example, FIG. 13 a formulation of an optimization problem in wireless networks where the optimization objective is to minimize the sum of all transmission rates $z_{i,JK}$. The main problem with the approach of FIG. 13 is that its computational complexity is exponential in the number of nodes. While this can be mitigated by grouping nodes in clusters and computing subgraphs among clusters, it is not applicable when scaling networks to 30-40 nodes of a flat (non-hierarchical) topology where nodes move independently and thus cannot be grouped. One solution is to replace the optimization method with a heuristic based on the MORE algorithm that is described later.

Briefly, the MORE algorithm determines, for a given multicast source and destination set and based on network topology and link qualities, which nodes participate in the forwarding of network coded packets and the intensity of each node's transmissions on behalf of the given session (forwarding factor). A difference in CONCERTO is the reliability algorithm: whereas MORE requires that each destination acknowledges periodically to the source its received data, CONCERTO implements a local, hop-by-hop NACK-based repair mechanism. This results in a significant reduction of control and data traffic and smaller end-to-end delays.

Subgraph Constructor Design

Two modifications can be implemented in the MORE algorithm to reduce overall transmissions. The first method of reducing transmissions employs numerical optimization to compute the best transmit rates for the nodes in the subgraph. The second method removes from a subgraph the nodes that are assigned a participation value smaller than a given threshold.

Transmission Reduction with Numerical Optimization

This enhancement attempts to reduce the number of transmissions/forwarders in a subgraph computed by the original MORE algorithms. One approach is to look at the "per destination" subgraphs computed by MORE, account for the overheard traffic and choose transmit rates more efficiently, as a result of an optimization problem.

More precisely, MORE computes "per destination" subgraphs and merges them (by taking the maximum transmission (tx) rate for each node). It was observed that this is suboptimal but "good enough" since problem formulation is only approximate anyway (we don't model retransmissions, impact of collisions on LQ, etc.). Nevertheless, in practice it can mean that subgraphs with large numbers of destinations have "too many" forwarders because hidden terminal interference is not modeled and more forwarders can reduce performance due to collisions.

The optimization problem's objective is to minimize overall transmission in the subgraph, subject to two constraints. The first constraint is that all destinations should receive at least the unit flow rate, which is defined as the minimum number of netcoded packets required to recreate the original traffic flow. The second constraint is that the new transmission rate of a node must be greater than or equal to the sum of all new transmission rates calculated for the node in the unicast source-destination subgraphs that comprise the multicast subgraph.

The formulation of the problem is stated in mathematical notation below.

1. Let M be the information received by a node.
2. Let D be the set of all destinations in a multicast group.
3. Let N be the set of all nodes in the unicast subgraphs that comprise a multicast subgraph.
4. Let $M_{ij}$ be the information overheard by destination i with respect to destination j's unicast subgraph.

Variables:

1. $\alpha_{jk}$—Multiplication factor applied to node j for destination k. This factor is applied equally to transmit rates (z) and information received by a node (M).
2. $w_i$—The transmit rate for node i in the multicast subgraph. In MORE this is the maximum $z_{ij}$, where j is a member of D.

Parameters:

1. $M_{ij}$—The information overheard by destination i with respect to destination j's unicast subgraph.
2. $z_{ij}$—The transmit rate of node i in a unicast subgraph for destination j.

Optimization Problem:

$$\min \sum_{i=1}^{N} w_i$$

Subject to:

$$\sum_{j=D_1, i \in D}^{D_n} \alpha_{ij} M_{ij} \geq 1$$

$$w_i \geq \sum_{j=D_1}^{D_n} \alpha_{ij} z_{ij}$$

The new transmission rates for each node, $w_i$, are used instead of the transmission rates calculated by MORE.

Transmission Reduction Through Node Selection

This method attempts to reduce overall transmissions in a subgraph by removing nodes with low transmission rates. Nodes with low transmission rates are those nodes whose transmit rate is below a configured threshold. If removal of nodes with low transmission rates disconnects the subgraph, the low rate threshold is reduced by 10%, and nodes are removed using this reduced threshold. This process iterates until a connected subgraph is obtained. Low rate thresholds can be configured separately for each type of traffic.

Subgraph Constructor Implementation

This section provides a high-level overview of the implementation.

Software Architecture

Figure 14:
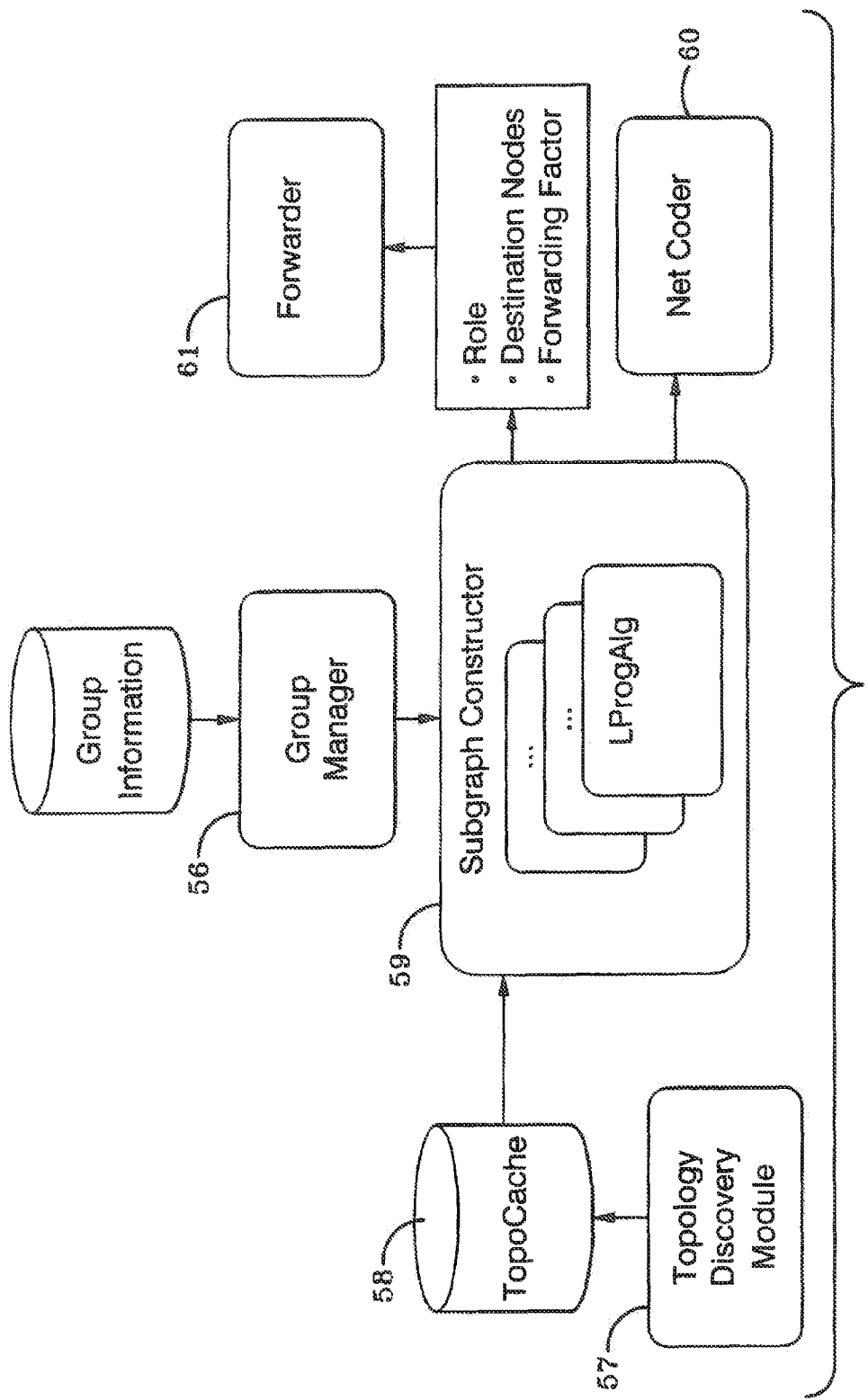
FIG. 14 illustrates an example subgraph constructor system diagram.

FIG. 14 illustrates how the Subgraph Constructor interacts with the other components in the system.

Group Manager—

The Group Manager 56 maps between the multicast IP addresses used by applications and the type of service that needs to be supported. The group manager 56 publishes the following information:
  group ID
  source node
  destination nodes
  application type (Elastic Reliable, Inelastic Class 3, Inelastic Class 2, Inelastic Class 1, Inelastic Class 0). Multiple classes are provided so different parameters can be used for different types of applications.

Topology Discovery Module—

The Topology Discovery Module 57 dynamically detects nodes and determines link quality using beacons and overheard traffic. It stores this information in the Topology Cache 58.

Topology Cache 58—

An object database that contains discovered nodes and their hyperarc and hyperlink information.

Subgraph Constructor—The subgraph constructor 59 iterates over Group Records and calculates subgraph information. It uses information from the topoCache 58 (which contains information about the nodes in the network, the links and the probability of loss associated with each link) and from the Group Manager 56 (which maps multicast addresses into type-of-service requirements). The subgraph constructor 59 produces information which is consumed by the NetCoder 60 and Forwarders 61 which implement transport level reliability mechanisms.

Net Coder 60—

Uses the subgraph information to determine when a Forwarder 61 should be set up for a given subgraph. The information needed by the Net Coder 60 includes:
  Subgraph ID—A number which uniquely designates a collection of source node, destination node(s) and traffic type that identifies one message from another.
  Role—Tells the Forwarder how the local node is expected to handle traffic received (e.g., forward, decode, both, etc.). The roles are Source, Forwarder, Destination, ForwarderDestination and NotParticipating. The Net Coder will only set up a Forwarder if the node has a valid participatory role for the subgraph.
  SrcRouted—Tells the Net Coder if the subgraph should anticipate source routed information or local broadcast information.

Forwarder 61– Uses subgraph information to transmit traffic in a fashion that minimizes the bandwidth used for a given link quality. The Forwarder uses a specific subset of the information published by the Subgraph Constructor which includes:
  Role—Delegates to the Forwarder how the local node is expected to handle traffic for the subgraph. (Ex. Source, Forwarder, Destination, ForwarderDestination or NotParticipating)
  Forwarding Factor—A calculated value based on link quality and bandwidth available that is intended to maximize the transmit flow.
  Destination Node ID(s)—Nodes that the Forwarder must ensure get full rank. A generation may be deleted if all known final consumer nodes have reached full rank for that generation.
  Subgraph ID—A number which uniquely designates a collection of source node, destination node(s) and traffic type that identifies one message from another.

Subgraph Dissemination

Subgraph information computed by the above algorithm is computed by each source node. This information is distributed to the other nodes in the subgraph using the same transport protocols used for application data.

The minimum information required to reconstruct a subgraph is as follows:

TABLE 1

Fields contained in SrcRoutedInfo metadata.

| Field Name | Description |
| --- | --- |
| Num_nodes | Number of nodes in the subgraph |
| Version | Incrementing sequence number |
| ID_list | An ordered list of node IDs constituting the subgraph |
| YVals | A list of forwarding factors for the participating nodes. Rates are encoded with a variable-size quanta (similar to ADPCM) into a single byte. |

Network Code Transport Protocols

Reliable Transport in MANETs

In CONCERTO, the goal of the transmission protocols is to maximize user utility. Utility typically has some goodput requirement (how much information must be received for it to be useful to the application) and a latency constraint (a time after which Information is no longer useful). Two reliable transport protocols were developed which are appropriate for use in unreliable MANETS using network coding and which are appropriate for different trade-offs between goodput and latency.

The current state-of-the-art reliability methods, were developed for wire-line networks, exhibit poor performance when applied to MANETs due to the network's highly dynamic nature (mobile nodes, links with high and variable losses). The CONCERTO transport protocols presented in this section take advantage of network coding's linear packet combinations and multipath routing to provide reliable transmission over such challenging networks.

Given the high rate of packet losses in MANETs, it is important to tailor reliability mechanisms to application requirements. In CONCERTO two types of reliability mechanisms were developed for the preferred embodiment Semi-reliable. Applications such as interactive voice or streaming video can tolerate a small percentage of missing packets, either due to losses in the network or to their late arrival time. Moreover, these applications can recover after a period of high loss without the need to recover all the packets lost in the past. Our semi-reliable algorithm strives to deliver a high fraction of packets to all receivers within defined latency bounds. Since latency requirements for these types of applications tend to be short (from 100 milliseconds to 1-2 seconds)—complicating the use of end-to-end mechanisms—our algorithm uses hop-by-hop mechanisms to provide low latency reliability.

Fully-reliable. Applications such as file transfer or email require that all packets constituting a data element (such as a file) be delivered, i.e., any missing data renders the whole transfer unusable. Typically latency requirements for such applications are more relaxed than for interactive applications. Our full reliability algorithm uses hop-by-hop and end-to-end mechanisms to ensure a complete data delivery, despite network events such as severe packet loss or network partitioning.

Even higher levels of reliability are possible, but are likely to require modifications to applications. For example, it's likely to be an application-dependent decision as to whether a file transfer should be initiated when some destinations are unreachable, how to respond to destinations that join a file transfer multicast group when the transfer has already been initiated, etc. At this level, the goal is to provide assured delivery of application-level data units (such as entire files) to all or a quorum of multicast receivers, as required by the application's semantics. This requires application level decisions regarding recovery strategies from network failures.

In the following sections the Network Coding Semi-Reliable and Fully-Reliable Transport Protocols are described.

Network Coding Semi-Reliable Transport Protocol

The Network Coding Semi-Reliable Transport Protocol is responsible for efficiently transmitting real-time application data over a wireless mobile ad-hoc network. Semi-reliable transmission is a component of the CONCERTO system that contributes to the CBMANET's main goal of providing improved efficiency of network capacity utilization.

Protocol Architecture

CONCERTO establishes a network coded multicast session by first building a subgraph (described above) where the source node is connected to the receiver nodes via a directed subgraph of nodes. In this directed subgraph, each node has downstream neighbors (except for destinations that are not forwarders) and upstream neighbors (except for the source). At the source, packets from application are first grouped in generations and then random linear combinations of packets in each generation are sent on hyperarcs (using local wireless broadcast) to the neighboring nodes. Each downstream node receives network coded packets, further combines those belonging to the same generation, and broadcasts them locally, thus being received by its downstream nodes within the subgraph. The destinations decode (as discussed earlier) the original packets when they have received enough linearly independent encoded packets from a generation.

To provide efficient and time-effective loss recovery, the preferred algorithm includes local repair strategies. Different from end-end algorithms such as TCP, local repair exploits the temporary storage of packets in intermediate nodes (necessary for network coding) to retransmit missing packets (or linear combinations of them), without the need for end-end feedback. Moreover, local repair also uses the local broadcast of wireless transmissions to opportunistically receive, store and help in packet loss repair, without any additional load on wireless channel capacity. These algorithms use the path diversity provided by the session's subgraph to circumvent possible communication failure between any neighbor nodes or a network region.

Figure 15:
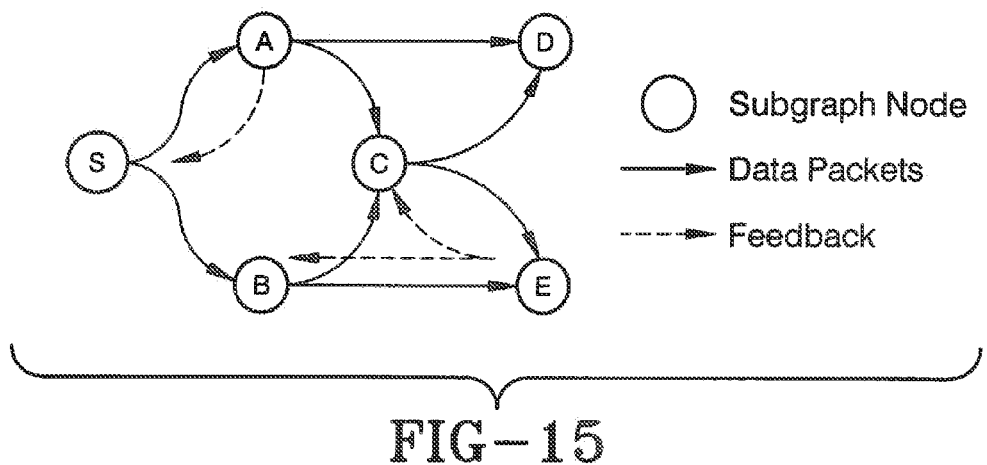
FIG. 15 illustrates a network showing the flow of data and reliability control information.

FIG. 15 illustrates a network showing the flow of data and reliability control information. In the following we illustrate the protocol using an example of a network given in. A multicast session consists of a sender node S and receiver nodes D and E. The session's subgraph also includes forwarding nodes A, B and C. Packets received from an application at the sender node are grouped into generations. Network coded packets (random linear combinations of the packets in the same generation) are then generated and transmitted over the wireless channel using local broadcast (solid arrows). The number of coded packets sent by the source may exceed the number of original packets in a generation by a forwarding factor that is designed to counteract the loss on the wireless channel. Its value (particular to each node) is a result of the subgraph construction algorithm described above.

The forwarding nodes in the subgraph store all received packets that form a linearly independent set within each generation (innovative packets), recombine them through random linear composition and send them again as local broadcast. Destination nodes store received packets and decode them for the destination application, as soon as the received generation has full rank (i.e., the matrix of encoding vectors can be inverted). The number of coded packets sent by a forwarding node as a result of innovative packets received is given by this node's forwarding factor. Its value is a function of this node's level of participation relative to other nodes in the subgraph, as well as of the estimated quality of transmission to neighboring nodes. As in the source's case, it is an output of the subgraph construction algorithm described above.

If too few coded packets are received in a generation within a given time, a node generates feedback requesting more packets from that generation (dashed arrows). The feedback information can be a description of what is missing from that generation (its "Null Space), the rank of that generation (number of linearly independent coded packets received in that generation), or just a flag that more information is required. There is a tradeoff between the size of the feedback and the specificity of feedback's information, both having an impact on the overall efficiency of transmission. In the preferred embodiment, an algorithm based on the Null Space feedback because it is found that it is overall more efficient and leads to better application performance than a simple "incomplete generation" feedback.

A "piggy-backing" strategy can be used where feedback requests are sent to upstream neighbors by including them in the headers of any data packets ready for transmission. This exploits the fact that broadcasts to downstream neighbors can usually be overheard by upstream neighbors. Any node that receives a feedback request can respond to that request by transmitting a random linear combination from that generation. Observe that this method provides efficient use of the wireless channel. This relatively low cost of feedback transmission permits redundant inclusion of feedback on multiple consecutive packets, thus enabling feedback delivery with high probability even at high levels of packet loss.

Finally, this algorithm decides generally only on which packets and feedback information to transmit, leaving the timing of their transmission to be decided by a rate control (QoS) module.

The Master/Slave Architecture of the Net Coding Transport Protocols

Each session (corresponding to a unique application traffic and a subgraph) is served by a part of the transport module called a slave forwarder, that receives data and control Information (feedback) for that session and chooses the next data and control information to be sent when it is the turn of this subgraph to transmit. A master forwarder arbitrates between all sessions existing on a node by scheduling among the associated slave forwarders according to a policy. Currently we implement a priority-based policy, where sessions with weaker delay constraints such as file transfer are selected for transmission only when there is no packet available to send from the tighter delay sessions such as voice and video.

Figure 16:
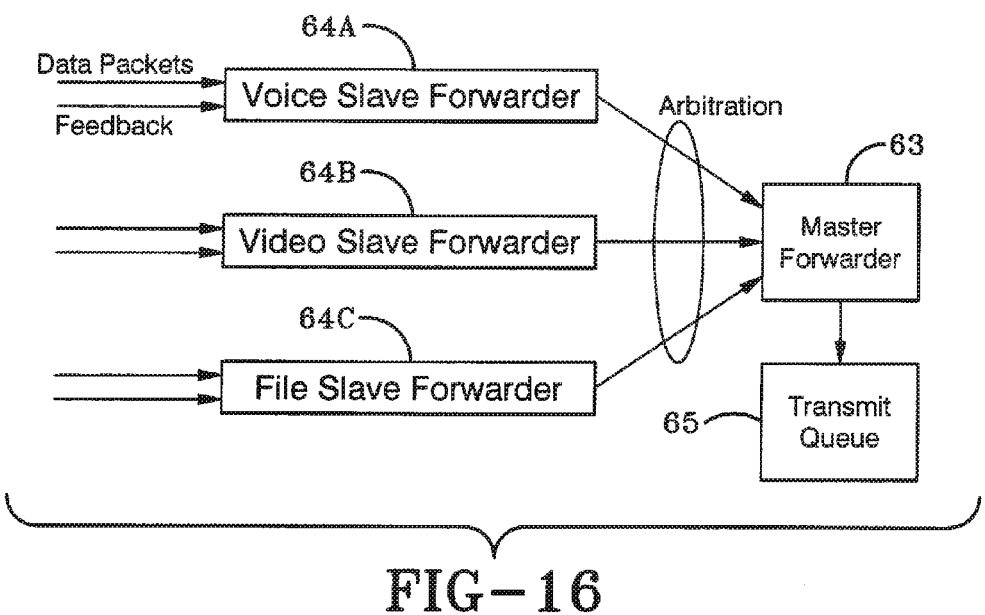
FIG. 16 illustrates an example master/slave forwarding architecture.

FIG. 16 illustrates and example a master/slave forwarding architecture. The Master Forwarder 63 chooses the highest priority session that has a packet to send and queries its associated slave forwarder 64A-C for a packet and feedback information from that session. It tries to put that packet in the transmit module's input queue 65 and, if that queue is not available, waits (blocks) until a packet is transmitted and thus space is made available. If there is no packet ready to be sent from any session, then it goes to sleep until is reactivated either by an innovative packet received by any session, or a timer requiring a retransmission from a session.

Figures 17, 18:
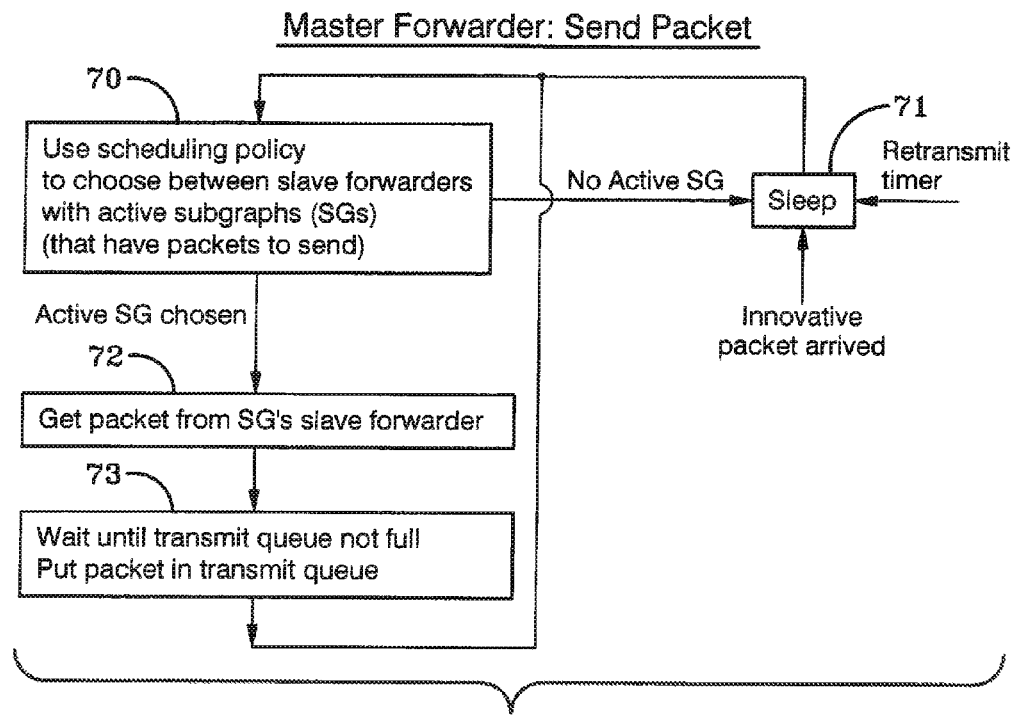
FIG. 17 illustrates the flow of sending a packet by the master forwarder.
FIG. 18 illustrates example steps used to get a packet by a slave forwarder.

The flow of this algorithm is illustrated in FIG. 17 as method steps. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

A scheduling policy is used, at 70, to choose between the slave forwarders 64A-C with active subgroups that have a packet to send. If there is no active subgroup then algorithm goes to sleep, at 71. If there is an active subgroup, then the packet is retrieved from the associate slave forwarder 64A-C, at 72. Next, the master forwarder 73 wait until the transmit queue 65 is not full and then places the packet in the queue 65, at 73. The algorithm is awoken from the sleep state if an innovative packet arrives or if the retransmit timer times out.

The Semi-Reliable Slave Forwarder Algorithm

The design of the semi-reliable transport algorithm has the following goals:

Minimize the number of packet transmissions per unit of application data. This supports the main goal of the project (reduce network bandwidth for the same amount of application rate) and thus has precedence over other goals below.

Minimize the time for transmitting a full generation. This would minimize the application end-end delay and keep the number of generations in progress to a minimum.

Minimize the delay between packet construction and packet transmission, so that the information transmitted in the packet is the most recent and thus the most comprehensive.

In the preferred embodiment, the slave forwarder assembles the next packet to send from a data part (chosen from the oldest generation that has a packet to send) and a control part (the set of all generations that need to receive more packets from upstream). The oldest-generation-first policy minimizes the time to complete the transmission of a generation and thus minimizes the end-to-end transmission delay. The actions that a slave forward 64A-C takes when choosing a packet to send include are summarized in FIG. 18.

The subgraph computation determines the rate at which each node in the subgraph must transmit to support a specified source rate. These rates can be used to compute the ratio between the amount of information a node is likely to receive and the amount of data it should transmit. In the preferred embodiment the network coding transport algorithm implements this model through the use of a forwarding factor which is defined as the ratio between the average number of packets sent and the number of innovative packets received. To realize such an average ratio, the algorithm maintains a credit counter that is incremented by the forwarding factor upon each innovative packet reception and is decremented by one for every packet sent, but limited to not become negative. In case of subunit credit, a packet is made available with probability equal to the credit. In the case of the source node, if we are not doing incremental coding, a complete generation is first assembled from application and then the credit counter is initialized with a credit equal to generation size times the forwarding factor. If CONCERTO is configured to do incremental coding, a generation gets credits as soon as there's an innovative packet received for that generation and the generation is ready to transmit to downstream nodes.

After the transmission of packets prompted by upstream data arrival (feed forward transmissions), there may be a need for more transmissions as some packets can be lost on the wireless channel beyond the redundant set provided for by the forwarding factor. Nodes that determine they have insufficient information (i.e., they are not full rank) request local repair packets via a feedback message (for the forwarding nodes, the feedback message is piggyback onto the data transmission when possible). Such a repair request is generated if no innovative packet is received within a time interval which is computed based on a statistics model of the normal innovative package rate. While feedback-based transmission is relatively efficient (packets are only sent if they are needed), it does introduce delays. The preferred embodiment of the algorithm allows us to adjust the parameters to trade-off between delay and efficiency.

As repair requests can potentially be received from many nodes within a short time, there is a possibility of sending redundant repair packets, since one packet can satisfy multiple requests (this is the known FEC-like property of network coding). To maximize efficiency, this algorithm uses a timer to accumulate such requests and produce one repair packet. The duration of this repair timer can be statically configured. A significant improvement in transmission delay can be achieved by introducing a dynamic repair timer that adapts to the average number of downstream nodes and the quality of local transmission.

Reliability Algorithms Using Null Space Feedback

Above the hop-by-hop semi-reliable transport protocol based on network coding was described. A design element is the local feedback by which a downstream node requests more coded packets in a network coded group (generation). This feedback information can range from a simple indication of generation incomplete (rank feedback, used in Phase 1) to more information that describes more precisely what is missing. Extensive experimental testing showed that rank feedback, while requiring a very small overhead, results in many redundant (non-innovative) transmissions by nodes responding to a repair request.

In the following we present the Null Space-based algorithm where the feedback information includes one vector (sample) in the Null Space of a partially received generation, and requests the transmission of a packet that is partly contained in that Null Space (i.e., is not orthogonal to that vector).

Generate_NSS Function

This function generates a Null Space Sample (NSS) which is a sample code vector that is in the Null Space of the received packets of a given generation at the local node. The Range Space of a given generation is defined to be the set of encoding vectors (linearly independent) known at the local node. It is a known fact in Linear Algebra that in any finite dimension vector space, the Null Space of a linear function is orthogonal with its Range Space. The preferred embodiment can assimilate the set of encoding vectors associated with the received packets in a generation with a linear function, and thus the space of missing encoding vectors is the same of the Null Space of the linear function, since they have to be linearly independent with the set of received vectors.

The computation of the Null Space vectors is as follows. The Range Space is represented by the set of the received (linearly independent) encoding vectors $a_{ij}$, i=1 ... r, j=1 ... n, where r is the rank of the Range Space. By linear operations on rows (using Gauss elimination), the above vectors can be transformed into a matrix that has identity matrix of size r on the left side. The matrix of transformed encoding vectors $[f_{ij}]$ becomes:

$$1\ 0\ 0\ ...\ 0\ a_{1r+1},\ ...\ a_{1n}$$

$$0\ 1\ 0\ ...\ 0\ a_{2r+1},\ ...\ a_{2n}$$

$$...$$

$$0\ 0\ 0\ ...\ 1\ a_{rr+1},\ ...\ a_{rn}$$

It is easy to see that a vector base of the null space $[g_{kj}]$ is $$-a_{1r+1},-a_{2r+1},\ ...\ a_{rr+1}, 1\ 0\ 0\ ...\ 0$$

$$...$$

$$-a_{1n},-a_{2n},\ ...\ a_{rn}, 0\ 0\ 0\ ...\ 1$$

because $$\sum_{j=1}^{n} f_{ij}g_{kj} = 0 \quad \forall\ i, k = 1\ ...\ r.$$

Also observe that the above computation of $[g_{kj}]$ is simple and thus not CPU intensive.

Observe that the size of the Null Space is n−k when the size of the Range Space (received, linearly independent packets) is k. While transmitting n−k vectors of n elements (total of n*(n−k) bytes) determines the missing information exactly, it may constitute an overhead too large. The solution can be adopted to generate a sample vector in the Null Space for a total feedback size of n per generation.

In summary, the algorithm for generating a sample vector in the null Space of a given generation is:
  Compute the Null Space vectors $[g_{kj}]$ as above
  Generate NSS as a random linear combination of the vectors of the Null Space The Forwarding Algorithm In the following we describe the forwarding algorithm of the hop-by-hop semi-reliable protocol, i.e., the process of receiving and sending packets and control information in a session. The behavior of the slave forwarder depends upon its role, which is one of the following: source, destination, forwarder or forwarder-destination.

Source Node
  data packet received from application
    assign the packet to a generation
    store it in the generation's packet buffer;
    if not use incremental coding,
      if generation rank==maxGenSize or generation-creation timer expired
        credit=GenSize*forwarding_factor
  session packet received from downstream
    if there is feedback data field in the packet, handle the feedback as the forwarding node
  send session packet
    same as forwarding node Forwarding Node
  session packet received
    if data is innovative
      put it in the PacketBuffer for that generation
      increment credit by forwarding_factor for this generation
    otherwise ignore it.
    if there is feedback data field in the packet
      same as in pure feedback received
  pure feedback packet received
    if not from downstream, ignore
    else if the coming NSS is in the local Range Space and the time from the last time this generation was sent is over the Repair Timeout,
      put the generation ID in the list of generations to send with the probability of the forwarding factor of the node
  master forwarder requests packet
    Choose a generation that has packets to send
      start with the oldest generation
    If a generation is chosen
      generate a mixture (linear combination of packets) from this generation
      decrement send_credit max(0, send_credit-)
      reset the repair_request flag to false
      set repair time=now+repair_interval
      for the oldest generation that does not have full rank, generate_NSS (Null Space Sample) for that Gen and piggyback it in the next data packet
    else if the current time has passed the scheduled feedback time
      generate the Null Space feedback
      set feedback_time=now+feedback_interval
  After generation life timer expires, discard generation Destination Node
  session packet received from network
    If data is innovative
      store it in PacketBuffer
    If the generation becomes full rank
      decode generation and send to application
  master forwarder requests packet
    if the current time passed the scheduled feedback time
      generate null space feedback for the oldest generation that does not have full rank
      set feedback_time=now+feedback_interval
  After generation life timer expires, discard generation Fully-Reliable Transport Protocol The semi-reliable forwarding algorithm described above provides recovery from many cases of lost packets based on detection of generations that do not have full rank. Nevertheless, this algorithm is not able to detect and recover other loss cases such as when a node has not received any packet in a generation. In this case, the node does not know the existence of that generation and thus, no repair requests is sent for the missing generation. If this node is a destination node, then all packets in that generation will not be sent to the application.

Full repair is a reliable end-to-end forwarding algorithm based on the hop-by-hop semi-reliable protocol described above and extended to detect and recover missing generations. In this extension, a destination node keeps track of the latest received generation and the next expected generation. If the next generation received is larger than the expected one, a gap in the received generation is detected. When this happens, the destination node will send repair requests for the missing generations. In addition, upstream nodes that miss that generation send repair requests for that generation as well, until some node (possibly the source) is reached that can provide packets in that generation.

Another issue for the fully-reliable protocol is a destination node that joins a session after the source node started sending a data unit (such as a file). Depending on the join time relative to the beginning of the sending of that file, providing the complete file to that new destination may require a large amount of retransmitted data. The solution strikes a balance between the extra load on the network and the benefit of satisfying the late destination by setting a limit to the amount of data that can be resent from the beginning of the data unit (file).

A problem is that the current design of the file transfer application (Legere) does not have the mechanism to tell CONCERTO that a packet is the first or last of a file transfer. A work-around this problem is for CONCERTO to detect beginning of file by measuring the time gap between consecutive packets received from application (currently set to 10 times a generation transmission time). When a source node detects a beginning of a new file transfer, it is considered the start of a new session. The generation received when the new session starts is set to be the first generation of the session. The information (ID) of the first generation of the current session is sent with all subsequent packets of that session. When a destination node joins a subgraph, it can then tell if it is receiving the file from the beginning and if not, how far it is behind. If the node found that it is not too far behind the first generation of the file transferring, it will put itself in a "in session" mode and operate as described above, including sending repair requests for the missing generations. Otherwise, the node will put itself in "not in session" mode, which means it ignores all the generations of the current file transfer. The maximum generation gap tolerance is a configurable parameter.

When a destination is in "not in session" mode, it is still receiving generations, updating the next generation to receive and keeps watching the first generation information in the coming packets. If the first generation ID precedes the next generation to receive, it means that the current file transfer has not finished yet. The node remains in "not in session" mode until the first-generation information in the packet is greater or equal to the next generation to receive. This is the way that the destination detects the beginning of a new file transfer. The destination node will switch to "In session" mode and assign the first generation to the next generation to receive.

The fully-reliable algorithm ensures that every packet from the sending application gets to the application at the destination node. A destination decodes when a generation has full rank, i.e., the number of innovative packets in the generation equals to the size of the generation. The size of a generation for the application is pre-configured. At the end of a file transfer, there may not be enough data packets to make a full size generation. In this case, the destination is expecting more innovative packets to fill the pre-configured generation size. To fix this problem, the generation size is passed from the source node to all the downstream nodes together with the data. When the source node wraps up a generation, it puts the real generation size in the packet. When the destination nodes receive the new generation size and found that the number of innovative packets it received in the generation is equal to the new generation size, it can decode the generation and send the packets to the application. If this new information about generation size is lost to a destination, that node will request repairs on that generation until a new packet is received with the correct generation size.

Dynamic Timers

The local repair strategy used in the Network Coding Semi-Reliable Transport Protocol, as described above, depends on a number of timed intervals. The values used for these time intervals are critical to the correct and efficient operation of the repair process. This section provides a description of the local repair strategy, an analysis of the time intervals, and a description of how the dynamic timer values are computed.

Local Repair Process Algorithm

Figure 19:
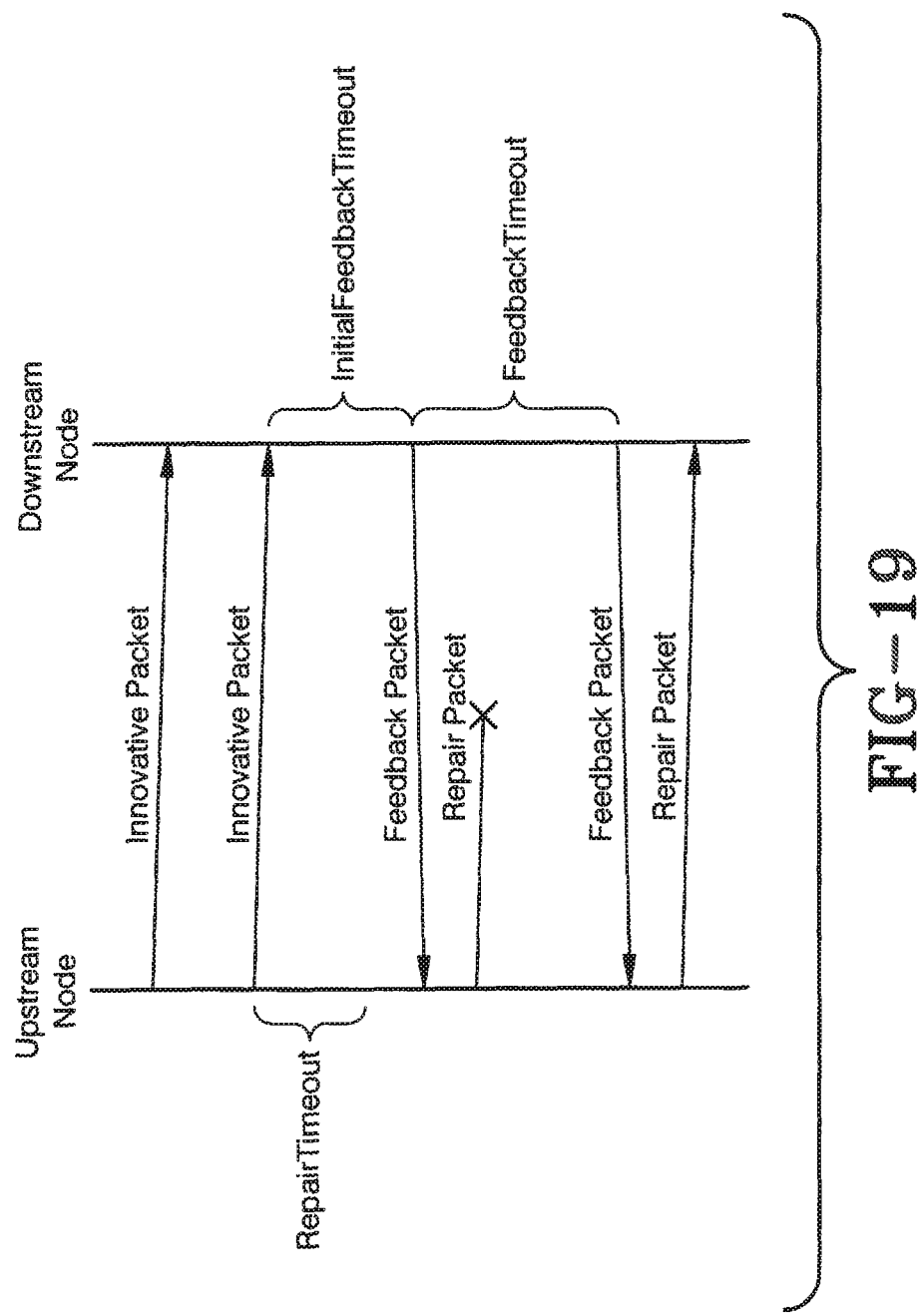
FIG. 19 illustrates an example local repair process with timer details.

The local repair process occurs at each node within a given subgraph. As innovative packets flow from upstream nodes to downstream nodes, each downstream node monitors the packets received from upstream. When a downstream node detects that an expected innovative packet did not arrive in a timely manner, the local repair process is started. The full process, with an example scenario shown in FIG. 19, involves the following steps.

1. For each generation within the subgraph that is not full rank, the time from the receipt of the last innovative packet to the current time is tested at regular intervals. If this time is less than or equal to InitialFeedbackTimeout, then no feedback packet is created for the generation. If this time is greater than InitialFeedbackTimeout, then the initial feedback packet (containing a repair request) is created for the generation and queued for transmission. Repair requests may be added to packets that include application data to be transmitted (i.e. piggyback repair requests) or contain only the repair request information (normal or "pure" repair requests).

2. After a feedback packet is transmitted, the time since this transmission is tested at regular intervals. If an innovative packet for the generation arrives during this time interval, then the local repair process for the subgraph generation is stopped and processing restarts in step 1. If an innovative packet for the generation has not been received and the time since the last feedback packet was sent is less than or equal to FeedbackTimeout, then the next feedback packet is not created yet. If an innovative packet for the generation has not been received and the time since the last feedback packet was sent is greater than FeedbackTimeout, then the next feedback packet is created and queued for transmission. Again, these repair requests may be either piggyback or normal repair requests.

3. Upon receipt of the feedback packet requesting a repair for the generation, the upstream node may or may not send the repair packet. If the time since the node has transmitted the last innovative packet for the generation is less than or equal to RepairTimeout, then the repair request is ignored. If the time since the node has transmitted the last innovative packet for the generation is greater than RepairTimeout, then a series of other tests are performed. If the generation has timed out, the requested repair packet is already queued for transmission, or the node has not received the data necessary for the repair, then the upstream node stops processing the repair request. Otherwise, the repair packet is created and queued for transmission.

Analysis of Repair Process Timers

The three timers involved in the local repair process described above are summarized as follows:

InitialFeedbackTimeout: The time interval since the last innovative packet for a non-rank-complete subgraph generation was received, after which a node will transmit the initial feedback packet to neighbors requesting a repair;

FeedbackTimeout: The time interval between subsequent feedback packet transmissions to neighbors repeating a repair request;

RepairTimeout: The time interval since the last innovative packet for a subgraph generation was transmitted, before which a node will not transmit a repair packet in response to a received feedback packet.

Upon examination of the three time intervals within the local repair strategy, the following relationships become clear. The InitialFeedbackTimeout starts the local repair process and depends on the expected rate of innovative packets at a particular node in the subgraph. Thus, the InitialFeedbackTimeout depends on the rate that the upstream node(s) are transmitting innovative packets for the subgraph to the local node, not on the underlying wireless network response time or neighbor response times. If this time interval is too small, then a node will end up sending unnecessary feedback packets. If this time interval is too large, then it will slow down the repair process, adding to the subgraph's data latency.

After a feedback packet is transmitted for a subgraph generation and no innovative packets are received, it is necessary to retransmit the feedback packet. These subsequent feedback packets depend on how quickly a neighbor can receive the feedback packet and transmit the necessary repair packets, not on the arrival rate of innovative packets from the upstream nodes. Thus, the FeedbackTimeout depends on the neighbor round-trip time, the feedback and repair packet sizes, and the expected amount of delay before queued packets are actually transmitted.

Once a feedback packet is received by a neighboring node, the RepairTimeout prevents the node from transmitting repair packets for the requested generation too soon after transmitting the last innovative packet for the generation. This is because the last innovative packet may provide the necessary repair due to the use of Network Coding. This time interval only needs to prevent the transmission of repair packets while the downstream node can receive and process the innovative packet that was recently transmitted.

Given the above, the FeedbackTimeout and RepairTimeout intervals were made to be configurable parameters that remain fixed for all nodes in the subgraph. During actual testing with video traffic, the optimal value for the FeedbackTimeout and RepairTimeout values were found to be 40 milliseconds and 20 milliseconds, respectively. The InitialFeedbackTimeout interval was made to be dynamically computed for each node in the subgraph. This self-tuning behavior allows the local repair process to track the innovative packet arrival rate at that point in the subgraph.

Subgraph Innovative Packet Inter-Arrival Time Estimation Approach

Each node in the subgraph uses the same algorithm to estimate the innovative packet inter-arrival time. This algorithm is the TCP RTT estimation algorithm. The algorithm attempts to estimate the average (using an exponentially weighted moving average) and mean deviation (which is easier to compute than the standard deviation) of the Innovative packet Inter-arrival time (IPIAT). This is then used as the InitialFeedbackTimeout value in the local repair request process.

The algorithm that can be used is:
M=measurement of IPIAT
A=estimate of IPIAT average
D=estimate of IPIAT mean deviation
g=0.125
h=0.25

$$Err=M-A$$

$$A<-A+(g*Err)$$

$$D<-D+(h*(ABS(Err)-D))$$

$$IPIAT=A+(4*D)$$

Based on this algorithm, sample IPIAT values taken from a normal distribution with a mean of 10.0 and a standard deviation of 2.0. The graph Simulation results show the InitialFeedbackTimeout values track the samples well without underestimating the next IPIAT that actually occurs. In a sample case, only 3 estimates out of the 400 total gave a value that was less than the actual next IPIAT, which would have caused a feedback packet to be sent During testing of this algorithm, it was observed that the InitialFeedbackTimout value can become very small during conditions of frequent Innovative packet arrivals. In fact, its value was observed going all the way down to 0 milliseconds (the accuracy of the time measurement implementation) for video traffic at various times. Having this time value go so low caused a lot of unnecessary feedback packets to be transmitted, which ended up hurting the overall video metrics. For this reason, the implementation was modified to include a simple InitialFeedbackTimeout floor value, which was set to 10 milliseconds. If the computed InitialFeedbackTimeout interval value was less than this floor value, then the floor value was used instead.

IP-CONCERTO Gateway

This section describes the gateway of CONCERTO system for interfacing with legacy networks based on IP unicast and multicast.

Motivation

A MANET using a new method of communication is of limited usefulness if it cannot interoperate with existing resources. To this end, gateway functionality in the CONCERTO system may be desired. This functionality allows data to be seamlessly exchanged between existing infrastructure and CONCERTO MANETs. An added benefit would be to allow geographically separated CONCERTO MANETs to communicate with each other via long haul existing infrastructure. For the purpose of this description, the existing resources will be occasionally referred to as the backchannel.

The objective of this effort was to allow CONCERTO MANETs to have any number of gateways associated with them from none to many. The system should use the available gateways in an efficient manner to exchange information with conventional network resources, when appropriate. This includes using those resources to enhance the operation and bandwidth of a single CONCERTO MANET and to communicate between segments of that MANET when it becomes partitioned. Lastly, all of this functionality must continue to operate in a reasonable manner in the face of mobility of both non-gateway and gateway nodes, between MANET partitions and in a manner that creates and merges partitions.

Gateway Design

The design objectives to be concerned about when adding multi-gateway support to MANETs are an egress routing capability where gateways must provide an egress route for the MANET nodes, an ingress routing capability where gateways enable external routers to route appropriate information into the MANET, transit network capability where existing network resources can be utilized as a transit network to allow segments of a partitioned MANET to communicate. Moreover, all of these objectives should react appropriately to the mobility of the MANET nodes. Constraints on the design were that the backchannel would use OSPF as its routing protocol and PIM in dense mode for its multicast group management. Additionally, it was also decided that the gateways should be designed not to use the MANET as a transit network for the backchannel and vice versa. As a future effort it might be desirable to allow the backchannel to serve as a transit network for a particular MANET. Concerto's unique "way of doing things" required new approaches to achieving the goal of MANET gateways.

Ingress Routing

In order for PIM to operate correctly on the backchannel and for unicast to find its way to the correct cloud, the backchannel needs routing information about what is present in a particular MANET. This required that OLSRd, OSPFd, and Zebra be run on all gateway nodes. The OLSRd on each gateway node takes in cloud routing information and feeds it through a hysteresis algorithm that smoothes out small variations in metric information before passing it to Zebra. Once in Zebra the OSPF process will extract the OLSR routes from Zebra and send them into the backchannel as OSPF external route updates. In this way all backchannel routers gain all the information they require to operate as if the CONCERTO cloud were just another network producing and consuming multicast/unicast data.

Once this routing configuration is done, ingress unicast routing will work appropriately, but for multicast traffic, as defined in the dense mode PIM rfc [RFC3973] the traffic will be flooded to every gateway of the local MANET. A gateway must indicate, via PIM, to the backchannel whether it wishes to receive that information or not. If all gateways indicated that they wished to receive the information, the likely result would be that all destinations in the MANET would receive duplicate packets for that multicast flow. Thus a multicast ingress gateway selection algorithm must be run at each gateway that will cause, optimally, only one gateway to indicate its wish to receive the information if there are destinations for that information in the local MANET cloud.

Multicast Ingress Gateway Selection Algorithm

The ingress gateway selection is "made" by each gateway where it determines what set of destinations, if any, it will support (i.e., be a source). To do this, a copy of the group cache is pre-processed before being passed on to the subgraph constructor. This pre-processing determines the set of gateways, the groups that each gateway can relay into the MANET and the destinations that each gateway can reach via ETX values.

The algorithm is:
  Extract all info on gateways from a copy of the group cache
  Create Subgraph IDs for each gateway
  For each group record
    For each gateway
      Compute the etx metric to all destinations
    Optimize gateway selection
      For each destination
        Find max/min etx
        Evaluate with threshold
      Remove subsets
    Reset group record with results Egress Routing In general the approach taken for egress routing is based around the assumption that any node not reachable in the local MANET is reachable via any node that identifies itself as a gateway node.

In the preferred embodiment a node is defined as reachable in the local MANET if there is a CONCERTO unicast group for that node in the group cache. This is a group that every node creates on startup for itself and advertises via its group cache updates. To support mobility, the group cache can be updated to time out entries for nodes that are no longer directly reachable via the local MANET.

Every gateway node identifies itself to the CONCERTO MANET by adding itself as a destination to a special gateway unicast CONCERTO group (currently group id 256). So whenever any node needs to know what the available gateways are, they just lookup the destination list of this special group.

To egress unicast traffic to nodes not directly reachable, a node simply sends that information to the special gateway unicast group. In the subgraph constructor this group is specially handled. Any traffic sent to this group, instead of being sent to all of the destinations which would lead to duplicate packets at the destination, is instead only sent to the destination (gateway) that has the lowest Etx from the source. This approach is done to optimize the use of MANET resources.

To egress multicast traffic all gateways will become a destination in the CONCERTO group cache for any CONCERTO multicast source that appears in the local MANET. The effect of this is that CONCERTO will deliver data for that new source to all available gateway nodes. Traffic arriving at those gateway nodes will drive state inside of PIM on both the gateway nodes and the routers on the backchannel. If appropriate, the routers in the backchannel will indicate, via a PIM prune message to a particular gateway node, that it should no longer deliver that data to the backchannel. That particular gateway node will react to this signal by removing itself as a destination for that particular multicast source inside the CONCERTO group cache. This action can be reversed if the backchannel sends a signal, via a PIM graft message, that it wishes that particular gateway node to begin delivering data again for that particular multicast source. In the case of multiple gateways each PIM router in the backchannel will make the determination of which gateway should deliver the data into the backchannel, based on the unicast route to the source. The unicast route in this instance would be the route handed into the backchannel as described in the ingress routing section. This behavior is the prescribed behavior of a PIM router as specified in the PIM dense mode RFC [RFC3973].

Transit Network Considerations

Once ingress and egress routing is established, at all gateways, the system has the ability to exchange information with resources on the backchannel, given appropriate configuration of CONCERTO. Also, the ability to exchange information between segments of a partitioned MANET, via the backchannel, works.

To prevent a MANET from becoming a transit network for backchannel nodes, OLSR running on the gateway nodes is prohibited from inserting OSPF information into the OLSR routing table. This has the effect of disallowing the backchannel routers from being aware that a MANET with multiple gateway nodes connects different parts of the backchannel together. Additionally all gateway nodes add information to the CONCERTO group cache that prohibits any gateway from sending information directly to another gateway. This has the additional benefit of solving potential routing loops when there are multiple sources and destinations for a particular multicast flow both inside the MANET and on the backchannel.

To prevent the backchannel from becoming a transit network for a particular MANET partition, the OSPF process can be prohibited from adding OSPF routing information to the kernel routing tables at the gateway node. This drives the state of the PIM process on the gateway node in such a way that it will always interpret a local source of multicast data as being reachable most efficiently via the MANET.

Pimdd module (PIM-DM)—is an open source implementation of the Protocol Independent Multicast—Dense Mode (PIM-DM) protocol specification and was selected because CenGen had already spent some time using this software and fixing bugs in it, additionally it is the most mature open source PIM dense mode implementation available.

Initially this implementation directly accessed the kernel to gain information about encountered multicast flows and set up multicast routes in the kernel. It also, initially, directly processed IGMP traffic to gain Information about multicast subscription from CONCERTO on directly connected LAN segments. Concerto can provide that same basic functionality so PIM-DM was modified with an IPC mechanism, instead of the kernel mechanisms, to allow CONCERTO to convey information about IGMP packets (IGMP Module), in cloud subscriptions and data flow.

For inbound data flows, especially in the case of multiple gateways associated with the local MANET cloud, the interest is only conveyed to PIM-DM if the system determines that the local gateway should be used to service the particular multicast flow into the MANET, via the multicast ingress gateway selection algorithm, and there is a Interest for that data in the local MANET.

Thanks to the IPC mechanism feeding the information that is no longer gained directly from the kernel, PIM-DM is allowed to run normally as it always has, and exchange normal PIM messages with the backchannel. The only additional requirement on PIM-DM is that it notifies CONCERTO of PIM prune messages and graft messages received from the backchannel regarding sources in the MANET, via the IPC messaging.

Figure 20:
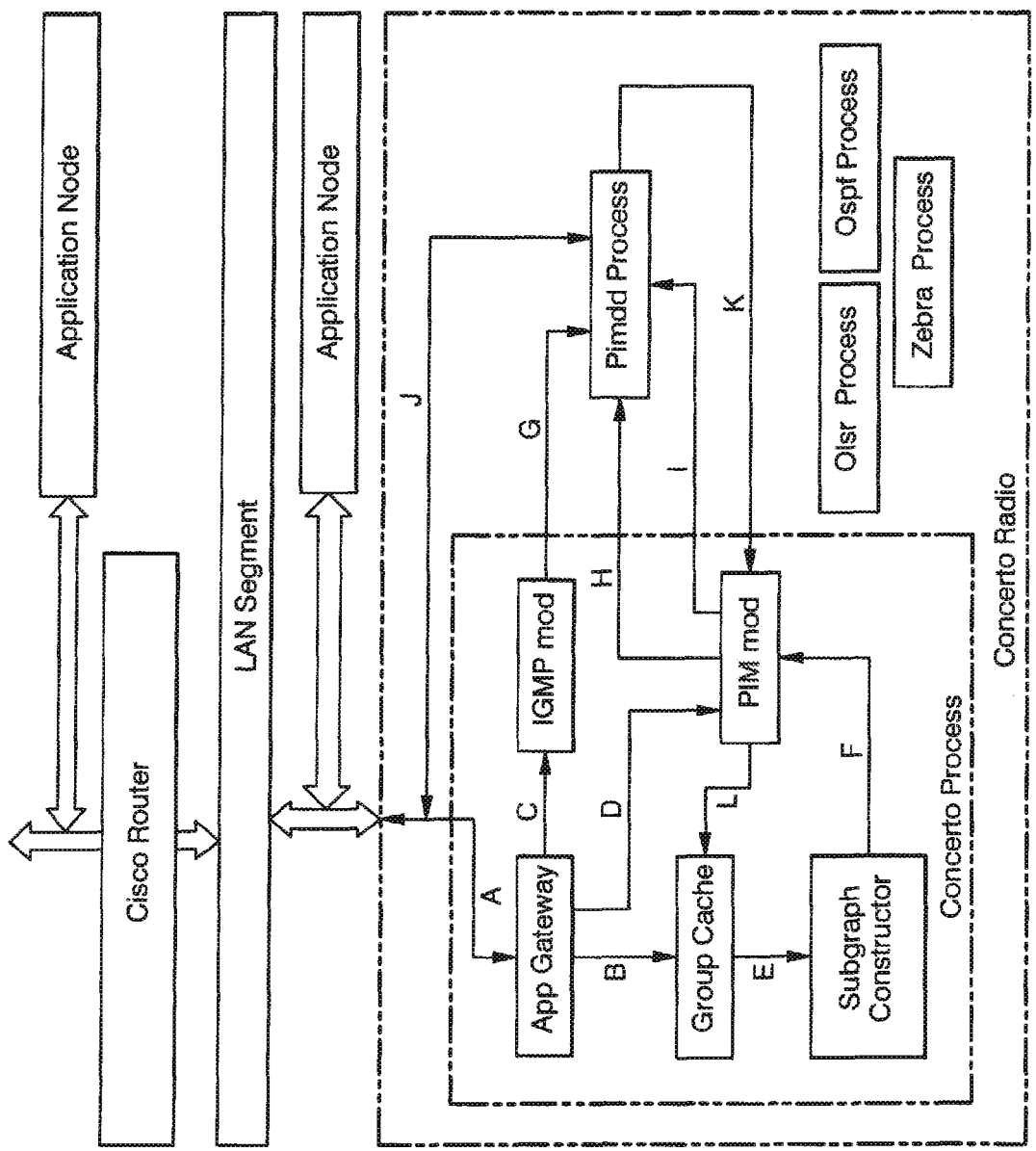
FIG. 20 illustrates an example gateway block diagram.
Figure 21:
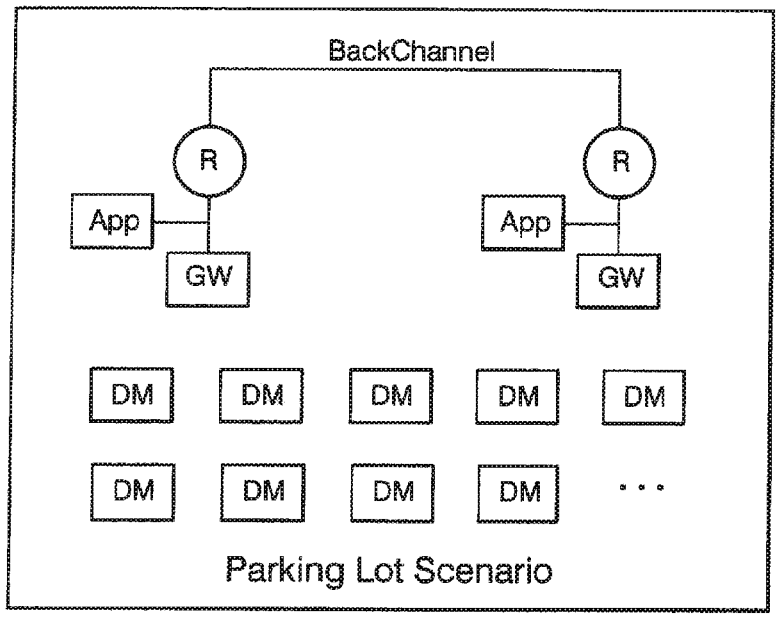
FIG. 21 illustrates a parking lot scenario.

FIG. 20 illustrates and example gateway block diagram. Referring to that figure, the information flow—
- A—Input/output of packets other then OSPF and PIM packets via device eth0 to app gateway
- B—Gateway related unicast group updates to group cache
- C—Inbound IGMPv2 and v3 packets to IGMP module
- D—src/dst IPs and packet flow direction to Pim module
- E—All group information
- F—Inbound gateway selection decision to Pim module
- G—IGMP group subscription in LAN information
- H—Multicast data flow information
- I—Information about MANET interest in multicast traffic
- J—PIM protocol exchanges with router
- K—IPC Prunes/Grafts messages passed on from router
- L—Group cache updates to reflect what multicast data the backchannel wants from this gateway node.

The Gateway Block Diagram of FIG. 20 shows the processes and modules that were modified and/or added to the system to facilitate gateway functionality. The following descriptions only address gateway related issues.

AppGateway—is Concerto's WAN side I/O module. IGMPv2 and v3 packets, C, are passed on to the IGMP module. The data packet source/destination and flow direction, D, are passed on to the PIM module. The Group Cache is updated, B, with any group information changes.

Group Cache—maintains the group state information that is used, E, by the Subgraph constructor to make routing decisions.

IGMP Module—manages membership of IP multicast groups from IGMP packets received, C, and conveys this info to the system and to the Pimdd process, G, via IPC messages.

Pim Module—Manages the multicast "state" of the gateway by monitoring input and output traffic, D, and exchanging IPC messages with the Pimdd process, H, I & K, Pimdd Process—A detailed description can be found above.

Subgraph Constructor—was modified to handle gateway selection. The results for each group gateway selection are propagated, F, up to the Pim module for further processing.

OLSR, OSPF and Zebra Process—these processes are described above.

Supported Configurations and Scenarios

Figure 22:
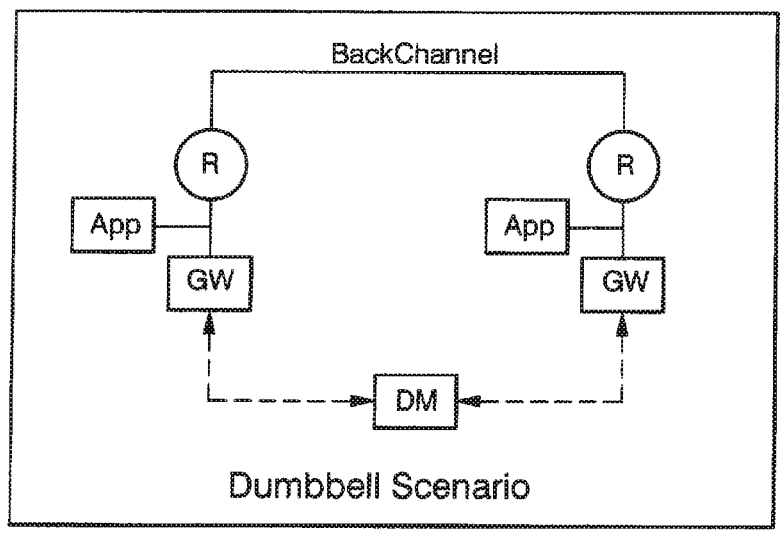
FIG. 22 illustrates a dumbbell scenario

Any concerto node can be utilized as a gateway node with the addition of the three processes zebra, OSPF, pimd and their configuration files. A gateway can support application nodes configured on the same LAN segment as itself as well as support application nodes located out side of the concerto MANET (i.e., on the far side of the local router.) Below are scenarios of Interest In the parking lot scenario illustrated in FIG. 22, all dismounts, DM, and gateways are in range of each other. With application nodes on the far side of the routers to provide interest outside the cloud, all the functionality described in this gateway upgrade comes into place.

In the dumbbell scenario illustrated in FIG. 23, gateways are widely separated and can reach each other over the backchannel and via the depicted dismount, but with poor link quality. If the left gateway is acting as a data relay for multicast data on the backchannel into the MANET for the dismount as it moves from the left gateway's coverage to the other, then the dismount would be best served by having the relaying gateway be the gateway on the right. The multicast gateway selection makes this possible.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "In the preferred embodiment" does not necessarily refer to the same embodiment, though it may.

What is claimed is:

1. A method for transmitting encoded data in a network comprising:
   grouping packets into a first generation of a plurality of packets;
   in a source node of a network, encoding the first generation using linearly-independent encoding vectors to produce an encoded first generation;
   transmitting the encoded first generation as a plurality of packets over a subgraph of nodes over multiple paths to a destination node, wherein the subgraph of nodes is a small group of nodes of the network;
   determining in a receiving node of the subgraph that an insufficient amount of packets of the encoded first generation have been received in the receiving node in order to decode the encoded first generation;
   sending a first repair request from the receiving node to nodes which are upstream of the receiving node, wherein the repair request indicates a need for more packets of the encoded first generation without specifying a particular packet;
   in response to the repair request, sending a packet with encoded first generation data to the receiving node from a first node which is upstream of the receiving node; and
   while in a fully-reliable mode further comprising:
   generating a second repair request in at least one node which is upstream of the receiving node and which does not have data of the encoded first generation, wherein the second repair request indicates a need for more packets with data of the encoded first generation without specifying a particular packet; and
   sending the second repair request from the at least one node to nodes which are upstream of the at least one node until a node with data of the encoded first generation receives the second repair request.

2. The method for transmitting encoded data of claim 1 wherein the nodes which are upstream of the receiving node are a single hop away from the receiving node and while in a semi-reliable mode further comprising:
   ignoring the first repair request at one or more of the nodes which are upstream of the receiving node when the one or more nodes do not have any data of the encoded first generation.

3. The method for transmitting encoded data of claim 1 wherein the encoded first generation is part of a file transfer on the network and further comprising, while in the fully-reliable mode:
   joining a new destination node to the subgraph;
   determining if the new destination node is too far behind in receiving the file transfer;
   if the new destination node is not too far behind in receiving the file transfer, placing the new destination node in an in session mode and accepting all generations of the file transfer; and
   if the new destination node is too far behind the file transfer, placing the new destination node in a not in session mode and ignoring all generations of the file transfer.

4. The method for transmitting encoded data of claim 3 further comprising:
   when the new destination node is in the in session mode, sending from the new destination node to nodes which are upstream of the new destination node repair requests to request missing generations of the encoded first generation.

5. The method for transmitting encoded data of claim 3 wherein the determining if the new destination node is too far behind in receiving the file transfer is based, at least in part, on an information identification of the first encoded generation that is included in all packets of the first encoded generation.

6. The method for transmitting encoded data of claim 3 further comprising:
   when encoded first generation information in the packets of the encoded first generation is equal to or greater than encoded second generation information in packets of a second encoded generation, switching the new destination node from the not in session mode to the in session mode and assigning a first generation that is to be received to the encoded second generation, wherein the assigning is done by the new destination node.

7. The method for transmitting encoded data of claim 1 further comprising:
   when the source node is ending transmission of the encoded first generation to the destination node, sending from the source node to the destination node a real generation size of the encoded first generation in a packet of the encoded first generation;
   determining at the destination node if encoded first generation data corresponds to the generation size; and
   when the encoded first generation data corresponds to the generation size, decoding the encoded first generation data to produce un-encoded data and presenting the un-encoded data to an application.

8. The method for transmitting encoded data of claim 1 wherein the sending the first repair request comprises:
   piggy backing the first repair request in a header of a data packet.

9. The method for transmitting encoded data of claim 1 further comprising:
   when enough of the encoded first generation is received at the destination node, decoding the encoded first generation and providing decoded data to an application.

10. The method for transmitting encoded data of claim 9 wherein the decoding comprises:
    decoding the encoded first generation based on Gaussian elimination.

11. The method for transmitting encoded data of claim 1 wherein, before the sending the packet with encoded first generation data to the receiving node, waiting a predetermined time after the first repair request is received at one of the nodes which is upstream of the receiving node.

12. The method for transmitting encoded data of claim 1 wherein the subgraph includes a forwarding node between the source node and the destination node and further comprising:
    determining a forwarding factor for the forwarding node, wherein the forwarding factor is a calculated value based, at least in part, on (a) link quality between the forwarding node and other nodes and (b) available bandwidth, and wherein timing of transmissions from the forwarding node are determined based, at least in part, on the forwarding factor.

13. The method for transmitting encoded data of claim 12 wherein the forwarding factor is defined as the ratio between an average number of packets sent by the forwarding node and a number of packets having encoded first generation data received by the forwarding node.

14. The method for transmitting encoded data of claim 13 further comprising:
    maintaining in the forwarding node a credit counter that is incremented by the forwarding factor upon each packet having encoded first generation data received by the forwarding node and is decremented by one for every packet sent by the forwarding node and limited to not become negative.

15. The method for transmitting encoded data of claim 1 further comprising:
- assembling at the source node a complete generation of the packets of the first generation;
- initializing a credit counter for the source node equal to a size of the complete generation times a forwarding factor of the source node, wherein the forwarding factor of the source node is a calculated value based, at least in part, on (a) link quality between the source node and other nodes and (b) available bandwidth; and
- transmitting data from the source node based, at least in part, on the credit counter.

16. The method for transmitting encoded data of claim 1 wherein the source node and the destination node are both wireless nodes.

17. A method for transmitting encoded data in a network comprising, while in a fully-reliable mode:
- grouping packets into a first generation of a plurality of packets;
- in a source node of a network, encoding the first generation using linearly-independent encoding vectors to produce an encoded first generation;
- transmitting the encoded first generation as a plurality of packets over a subgraph of nodes over multiple paths to a destination node, wherein the subgraph of nodes is a small group of nodes of the network;
- determining in a receiving node of the subgraph that an insufficient amount of packets of the encoded first generation have been received in the receiving node in order to decode the encoded first generation;
- sending a repair request from the receiving node to nodes which are upstream of the receiving node, wherein the repair request indicates a need for more packets of the encoded first generation without specifying a particular packet;
- in response to the repair request, sending a packet with encoded first generation data to the receiving node from a first node which is upstream of the receiving node;
- at the destination node, keeping track of the packets of the encoded first generation and a next encoded second generation and detecting a gap in generations received at the destination node by detecting that the encoded second generation is larger than expected; and
- sending requests from the destination node to nodes which are upstream of the destination node for more packets of the encoded first generation until the encoded first generation is complete enough to be decoded at the destination node.

18. A method comprising:
- encoding data into an encoded first generation;
- transmitting from a source node to a network node a plurality of first generation packets of the encoded first generation, the first generation packets containing random linear combinations of data sets which are linearly independent within the encoded first generation;
- determining that not enough of the first generation packets have been received at the network node to decode the first generation packets;
- based, at least in part on the determining, generating and sending a first repair request from the network node to nodes which are upstream of the network node, wherein the repair request indicates a need for more packets of the encoded first generation;
- in response to the repair request, sending a packet with encoded first generation data to the network node from a first node which is upstream of the network node; and
- while in a fully-reliable mode further comprising:
- generating a second repair request in at least one node which is upstream of the network node and which does not have data of the encoded first generation, wherein the second repair request indicates a need for more packets with data of the encoded first generation; and
- sending the second repair request from the at least one node to nodes which are upstream of the at least one node until a node with data of the encoded first generation receives the second repair request.

19. The method of claim 18 wherein the encoding comprises encoding data into the encoded first generation using linearly-independent encoding vectors; and
- wherein the generating and sending the first repair request comprises generating and sending the first repair request without specifying any missing first generation packets.

* * * * *